US012140934B2

(12) United States Patent
Suginishi et al.

(10) Patent No.: US 12,140,934 B2
(45) Date of Patent: Nov. 12, 2024

(54) DISTRIBUTED PRODUCTION PLANNING AND INSTRUCTION APPARATUS AND DISTRIBUTED PRODUCTION PLANNING AND INSTRUCTION SYSTEM

(71) Applicant: HITACHI, LTD., Tokyo (JP)

(72) Inventors: Yuuichi Suginishi, Tokyo (JP); Takafumi Chida, Tokyo (JP)

(73) Assignee: HITACHI, LTD., Tokyo (JP)

( * ) Notice: Subject to any disclaimer, the term of this patent is extended or adjusted under 35 U.S.C. 154(b) by 272 days.

(21) Appl. No.: 17/712,249

(22) Filed: Apr. 4, 2022

(65) Prior Publication Data

US 2022/0342399 A1 Oct. 27, 2022

(30) Foreign Application Priority Data

Apr. 27, 2021 (JP) .................................. 2021-74902

(51) Int. Cl.
*G05B 19/418* (2006.01)
(52) U.S. Cl.
CPC ... *G05B 19/41865* (2013.01); *G05B 19/4188* (2013.01); *G05B 19/41885* (2013.01)
(58) Field of Classification Search
None
See application file for complete search history.

(56) References Cited

U.S. PATENT DOCUMENTS

2003/0195794 A1 10/2003 Yasuda

2017/0343994 A1 11/2017 Nishi et al.
2018/0029803 A1 2/2018 Buschmann et al.
2020/0058081 A1 2/2020 Saneyoshi et al.
(Continued)

FOREIGN PATENT DOCUMENTS

JP 2020-98541 A 6/2020

OTHER PUBLICATIONS

Extended European Search Report received in corresponding European Application No. 22165729.9 dated Sep. 13, 2022.
(Continued)

*Primary Examiner* — Ryan A Jarrett
(74) *Attorney, Agent, or Firm* — MATTINGLY & MALUR, PC

(57) ABSTRACT

The apparatus includes: a storage unit configured to store a production instruction serving as an operation instruction for a production element including a production facility of a factory, a production resource, and an operator, production state information including an occurrence state of an abnormality of the production element, and facility-process relation information for identifying, for each process to be performed by the production element, another production element capable of alternatively performing the process; a planning change necessity determination unit configured to, when an abnormality in execution of the production instruction occurs in the production element, determine that planning change is unnecessary when the production instruction can be complied in consideration of a stop period of the production element that is caused by the abnormality; a distributed planning range calculation unit configured to include the another alternative production element in a re-planning target range; and a distributed planning generation unit.

6 Claims, 21 Drawing Sheets

(56) References Cited

U.S. PATENT DOCUMENTS

2020/0370905 A1   11/2020  Noda et al.
2024/0127156 A1*  4/2024  Bembde ................. G06Q 50/04

OTHER PUBLICATIONS

European Office Action received in corresponding European Application No. 22165729.9 dated Feb. 28, 2024.
Communication Pursuant to Article 94(3) EPC received in corresponding European Application No. 22 165 729.9 dated Sep. 19, 2024.

* cited by examiner

[FIG. 1]
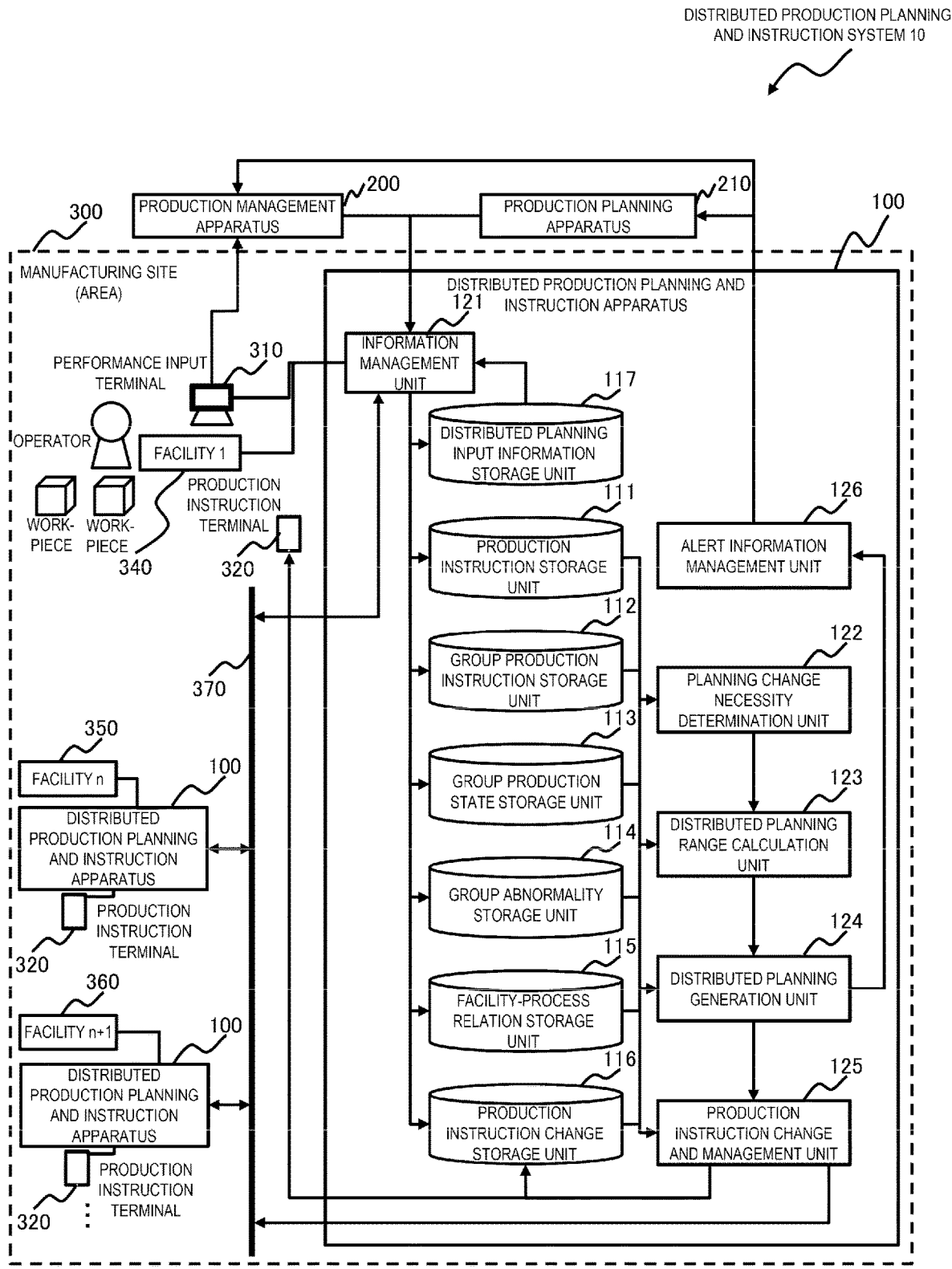

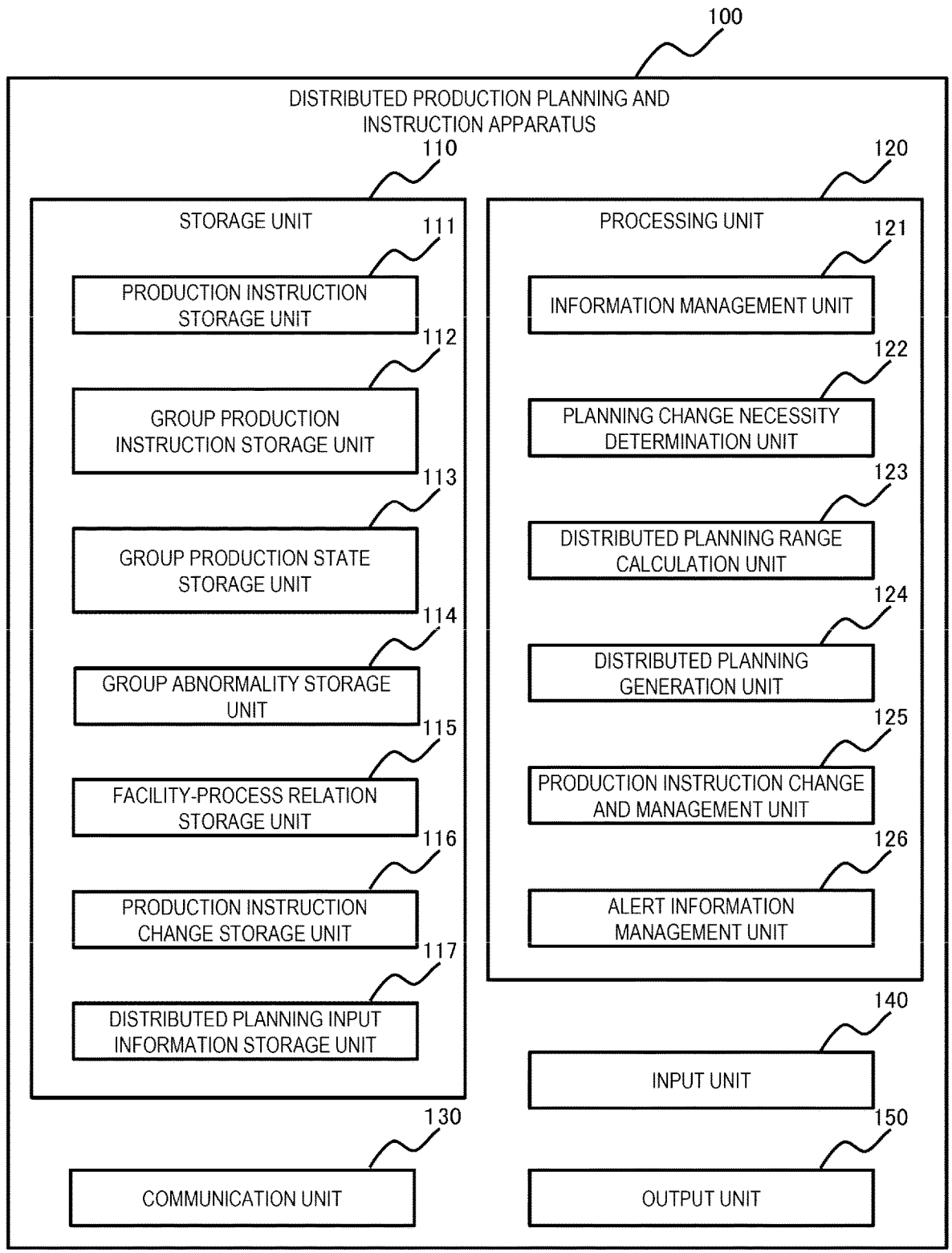
[FIG. 2]

[FIG. 3]

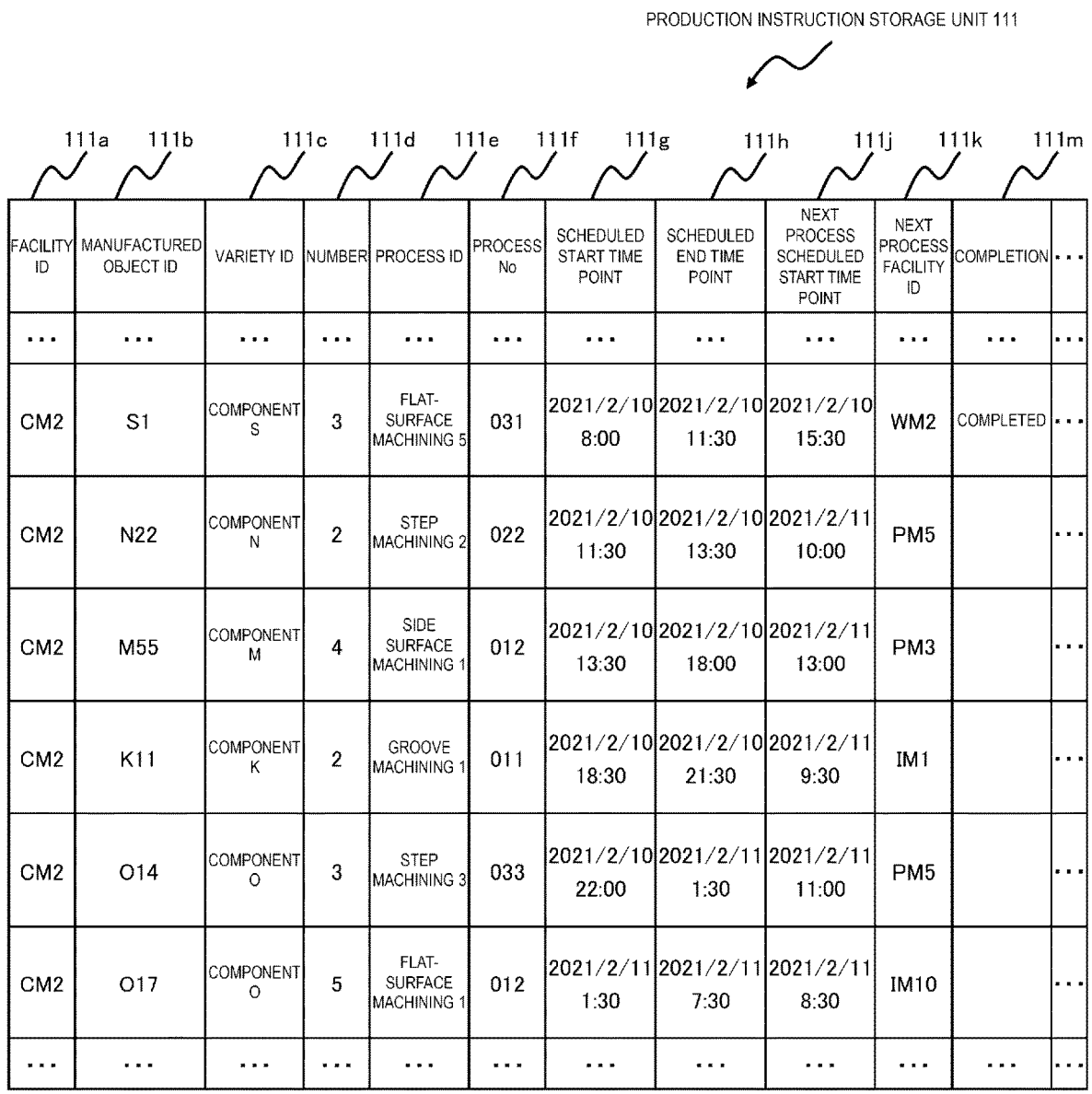

PRODUCTION INSTRUCTION STORAGE UNIT 111

| FACILITY ID | MANUFACTURED OBJECT ID | VARIETY ID | NUMBER | PROCESS ID | PROCESS No | SCHEDULED START TIME POINT | SCHEDULED END TIME POINT | NEXT PROCESS SCHEDULED START TIME POINT | NEXT PROCESS FACILITY ID | COMPLETION | ... |
|---|---|---|---|---|---|---|---|---|---|---|---|
| ... | ... | ... | ... | ... | ... | ... | ... | ... | ... | ... | ... |
| CM2 | S1 | COMPONENT S | 3 | FLAT-SURFACE MACHINING 5 | 031 | 2021/2/10 8:00 | 2021/2/10 11:30 | 2021/2/10 15:30 | WM2 | COMPLETED | ... |
| CM2 | N22 | COMPONENT N | 2 | STEP MACHINING 2 | 022 | 2021/2/10 11:30 | 2021/2/10 13:30 | 2021/2/11 10:00 | PM5 | | ... |
| CM2 | M55 | COMPONENT M | 4 | SIDE SURFACE MACHINING 1 | 012 | 2021/2/10 13:30 | 2021/2/10 18:00 | 2021/2/11 13:00 | PM3 | | ... |
| CM2 | K11 | COMPONENT K | 2 | GROOVE MACHINING 1 | 011 | 2021/2/10 18:30 | 2021/2/10 21:30 | 2021/2/11 9:30 | IM1 | | ... |
| CM2 | O14 | COMPONENT O | 3 | STEP MACHINING 3 | 033 | 2021/2/10 22:00 | 2021/2/11 1:30 | 2021/2/11 11:00 | PM5 | | ... |
| CM2 | O17 | COMPONENT O | 5 | FLAT-SURFACE MACHINING 1 | 012 | 2021/2/11 1:30 | 2021/2/11 7:30 | 2021/2/11 8:30 | IM10 | | ... |
| ... | ... | ... | ... | ... | ... | ... | ... | ... | ... | ... | ... |

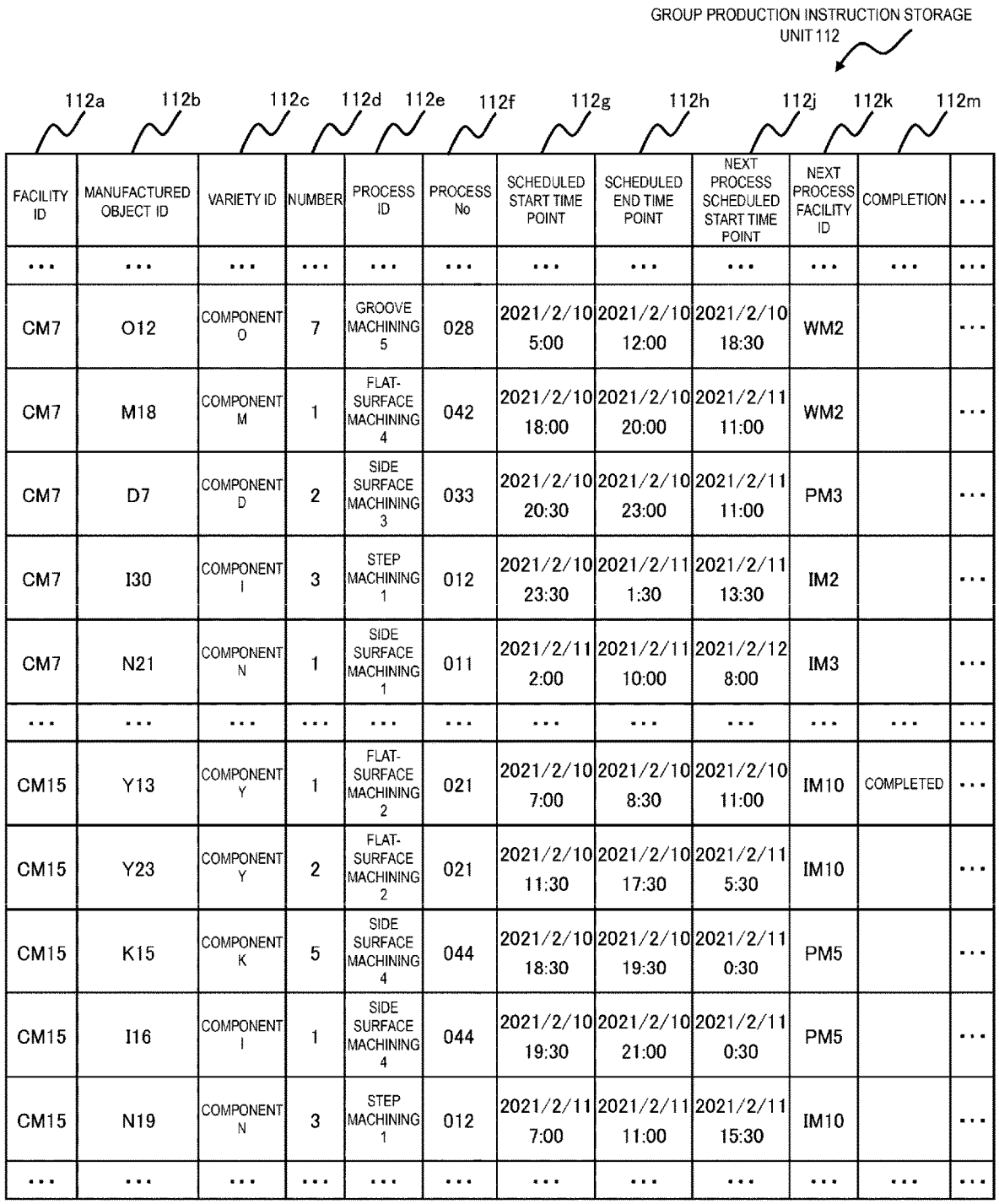

| FACILITY ID | MANUFACTURED OBJECT ID | VARIETY ID | NUMBER | PROCESS ID | PROCESS No | SCHEDULED START TIME POINT | SCHEDULED END TIME POINT | NEXT PROCESS SCHEDULED START TIME POINT | NEXT PROCESS FACILITY ID | COMPLETION | ... |
|---|---|---|---|---|---|---|---|---|---|---|---|
| ... | ... | ... | ... | ... | ... | ... | ... | ... | ... | ... | ... |
| CM7 | O12 | COMPONENT O | 7 | GROOVE MACHINING 5 | 028 | 2021/2/10 5:00 | 2021/2/10 12:00 | 2021/2/10 18:30 | WM2 | | ... |
| CM7 | M18 | COMPONENT M | 1 | FLAT-SURFACE MACHINING 4 | 042 | 2021/2/10 18:00 | 2021/2/10 20:00 | 2021/2/11 11:00 | WM2 | | ... |
| CM7 | D7 | COMPONENT D | 2 | SIDE SURFACE MACHINING 3 | 033 | 2021/2/10 20:30 | 2021/2/10 23:00 | 2021/2/11 11:00 | PM3 | | ... |
| CM7 | I30 | COMPONENT I | 3 | STEP MACHINING 1 | 012 | 2021/2/10 23:30 | 2021/2/11 1:30 | 2021/2/11 13:30 | IM2 | | ... |
| CM7 | N21 | COMPONENT N | 1 | SIDE SURFACE MACHINING 1 | 011 | 2021/2/11 2:00 | 2021/2/11 10:00 | 2021/2/12 8:00 | IM3 | | ... |
| ... | ... | ... | ... | ... | ... | ... | ... | ... | ... | ... | ... |
| CM15 | Y13 | COMPONENT Y | 1 | FLAT-SURFACE MACHINING 2 | 021 | 2021/2/10 7:00 | 2021/2/10 8:30 | 2021/2/10 11:00 | IM10 | COMPLETED | ... |
| CM15 | Y23 | COMPONENT Y | 2 | FLAT-SURFACE MACHINING 2 | 021 | 2021/2/10 11:30 | 2021/2/10 17:30 | 2021/2/11 5:30 | IM10 | | ... |
| CM15 | K15 | COMPONENT K | 5 | SIDE SURFACE MACHINING 4 | 044 | 2021/2/10 18:30 | 2021/2/10 19:30 | 2021/2/11 0:30 | PM5 | | ... |
| CM15 | I16 | COMPONENT I | 1 | SIDE SURFACE MACHINING 4 | 044 | 2021/2/10 19:30 | 2021/2/10 21:00 | 2021/2/11 0:30 | PM5 | | ... |
| CM15 | N19 | COMPONENT N | 3 | STEP MACHINING 1 | 012 | 2021/2/11 7:00 | 2021/2/11 11:00 | 2021/2/11 15:30 | IM10 | | ... |
| ... | ... | ... | ... | ... | ... | ... | ... | ... | ... | ... | ... |

[FIG. 5]
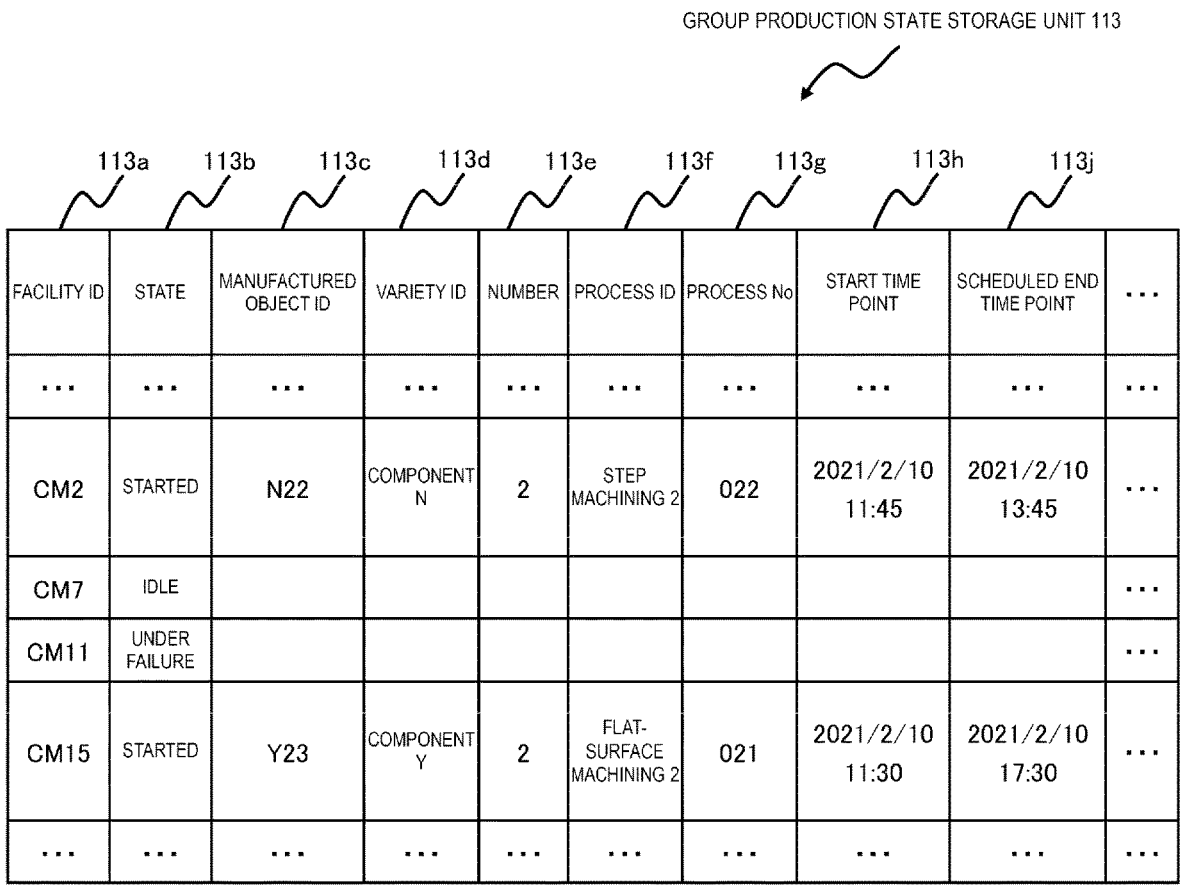
GROUP PRODUCTION STATE STORAGE UNIT 113

[FIG. 6]

GROUP ABNORMALITY STORAGE UNIT 114

| FACILITY ID | ABNORMALITY STATE | OCCURRENCE TIME POINT | SCHEDULED RECOVERY TIME POINT | COUNTERMEASURE STATE | ... |
|---|---|---|---|---|---|
| ... | ... | ... | ... | ... | ... |
| CM3 | FAILURE | 2021/2/10 11:00 | 2021/2/11 12:00 | NOT YET | ... |
| CM7 | FAILURE | 2021/2/10 11:00 | 2021/2/10 12:00 | UNNECESSARY | ... |
| ... | ... | ... | ... | ... | ... |

114a, 114b, 114c, 114d, 114e

[FIG. 7]
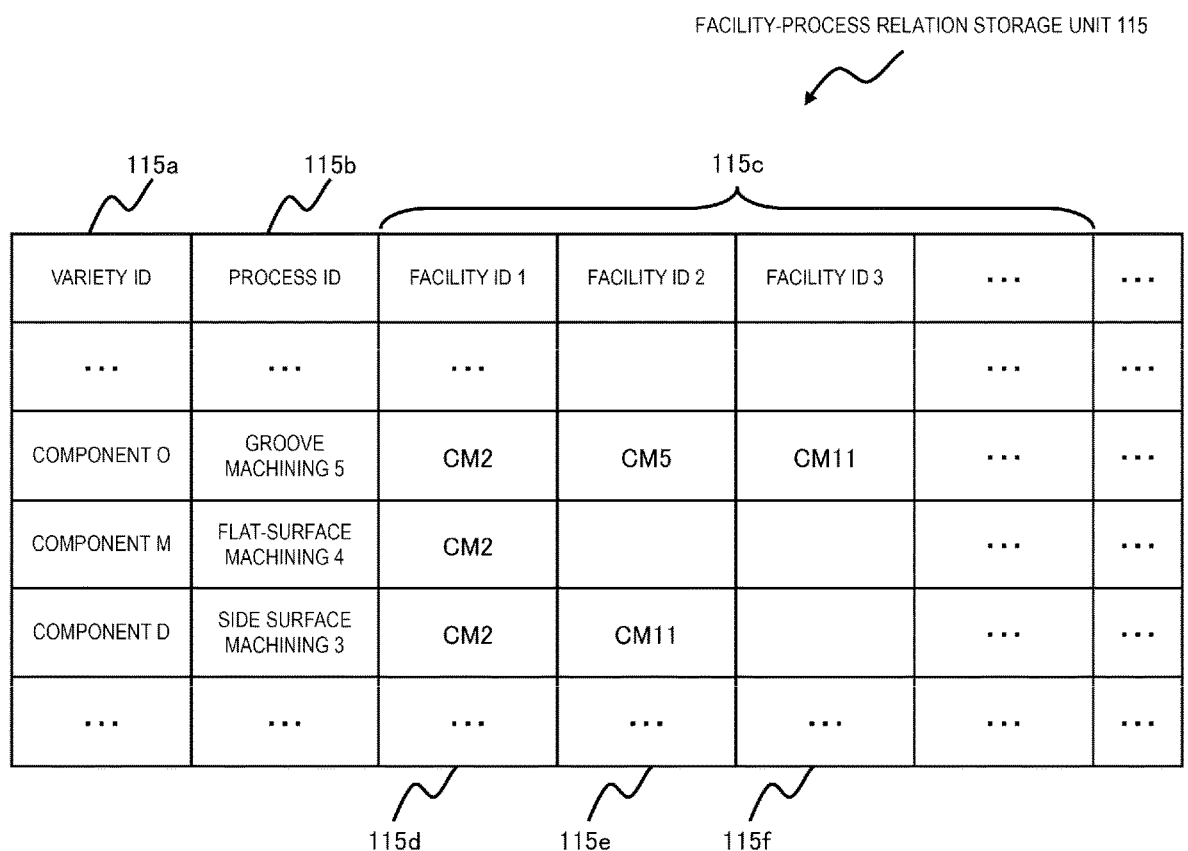

[FIG. 8]

PRODUCTION INSTRUCTION CHANGE STORAGE UNIT 116

| 116a | 116b | 116c | 116d | 116e | 116f | 116g | 116h | 116j | 116k | 116m | 116p |
|---|---|---|---|---|---|---|---|---|---|---|---|
| PRE-CHANGE FACILITY ID | POST-CHANGE FACILITY ID | MANUFACTURED OBJECT ID | VARIETY ID | NUMBER | PROCESS ID | PROCESS No | SCHEDULED START TIME POINT | SCHEDULED END TIME POINT | NEXT PROCESS SCHEDULED START TIME POINT | NEXT PROCESS FACILITY ID | CHANGE STATE | ... |
| ... | ... | ... | ... | ... | ... | ... | ... | ... | ... | ... | ... |
| CM2 | CM2 | S1 | COMPONENT S | 3 | FLAT-SURFACE MACHINING 5 | 031 | 2021/2/10 8:00 | 2021/2/10 11:30 | 2021/2/10 15:30 | IM2 | COMPLETED | ... |
| CM2 | CM7 | N22 | COMPONENT N | 2 | STEP MACHINING 2 | 022 | 2021/2/10 11:30 | 2021/2/10 13:30 | 2021/2/11 10:00 | IM3 | COMPLETED | ... |
| ... | ... | ... | ... | ... | ... | ... | ... | ... | ... | ... | ... | ... |
| CM5 | CM2 | K11 | COMPONENT K | 2 | GROOVE MACHINING 1 | 011 | 2021/2/10 18:30 | 2021/2/10 21:30 | 2021/2/11 9:30 | WM3 | | ... |
| ... | ... | ... | ... | ... | ... | ... | ... | ... | ... | ... | ... | ... |

[FIG. 9]

DISTRIBUTED PLANNING INPUT INFORMATION STORAGE UNIT 117

| FACILITY ID | FACILITY CAPABILITY | CONNECTION INFORMATION | TRANSPORT TIME | TRANSPORT REQUEST DESTINATION INFORMATION | TYPE | ... |
|---|---|---|---|---|---|---|
| CM2 | 1 | | – | – | CURRENT | ... |
| ... | ... | ... | ... | ... | ... | ... |
| CM1 | 1 | 1.22.1.34 | 10 | 1.22.1.10 | GROUP | ... |
| CM22 | 2 | 1.22.1.55 | 20 | 1.22.1.10 | GROUP | ... |
| ... | ... | ... | ... | ... | ... | ... |
| IM5 | 1 | 1.22.1.10 | 30 | 1.22.1.10 | NEXT PROCESS | ... |
| OM17 | 1 | 1.22.1.48 | 60 | | NEXT PROCESS | ... |
| ... | ... | ... | ... | ... | ... | ... |

Columns: 117a, 117b, 117c, 117d, 117e, 117f

[FIG. 10]
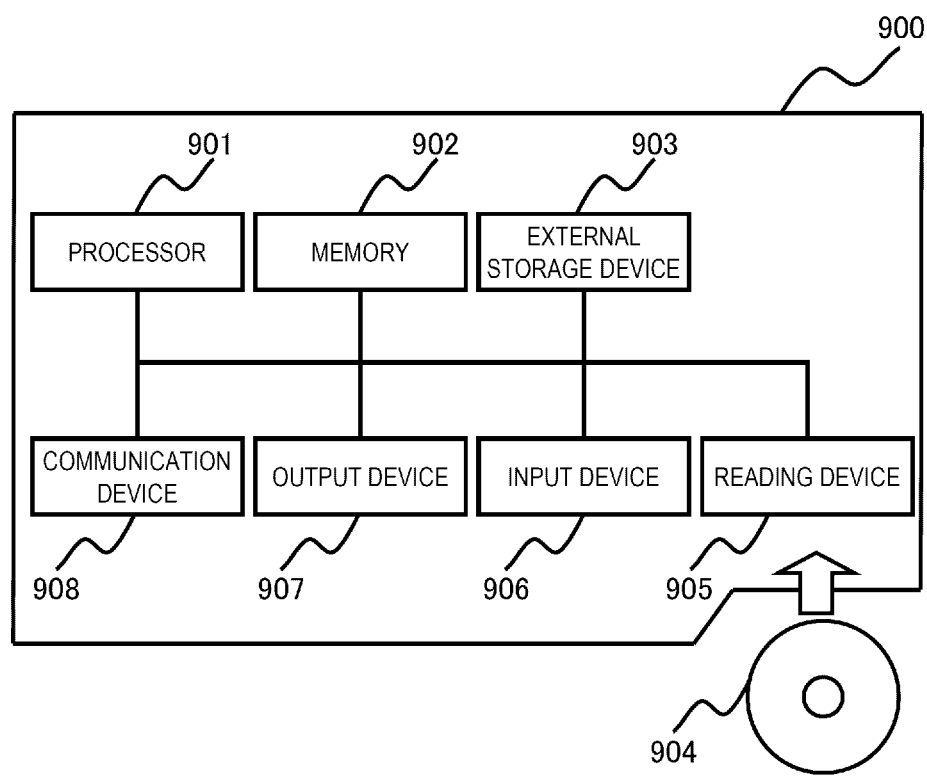

[FIG. 11]
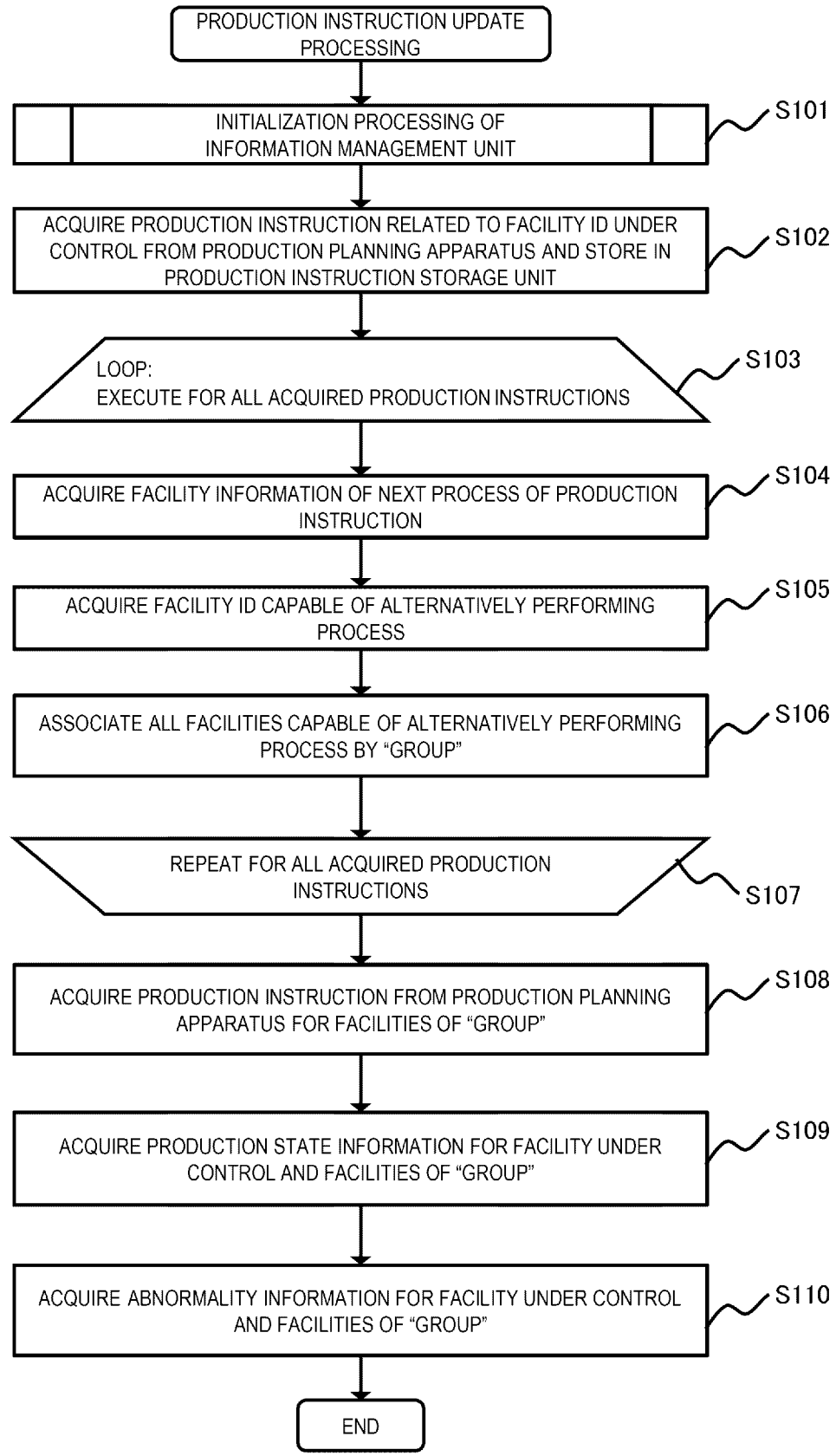

[FIG. 12]
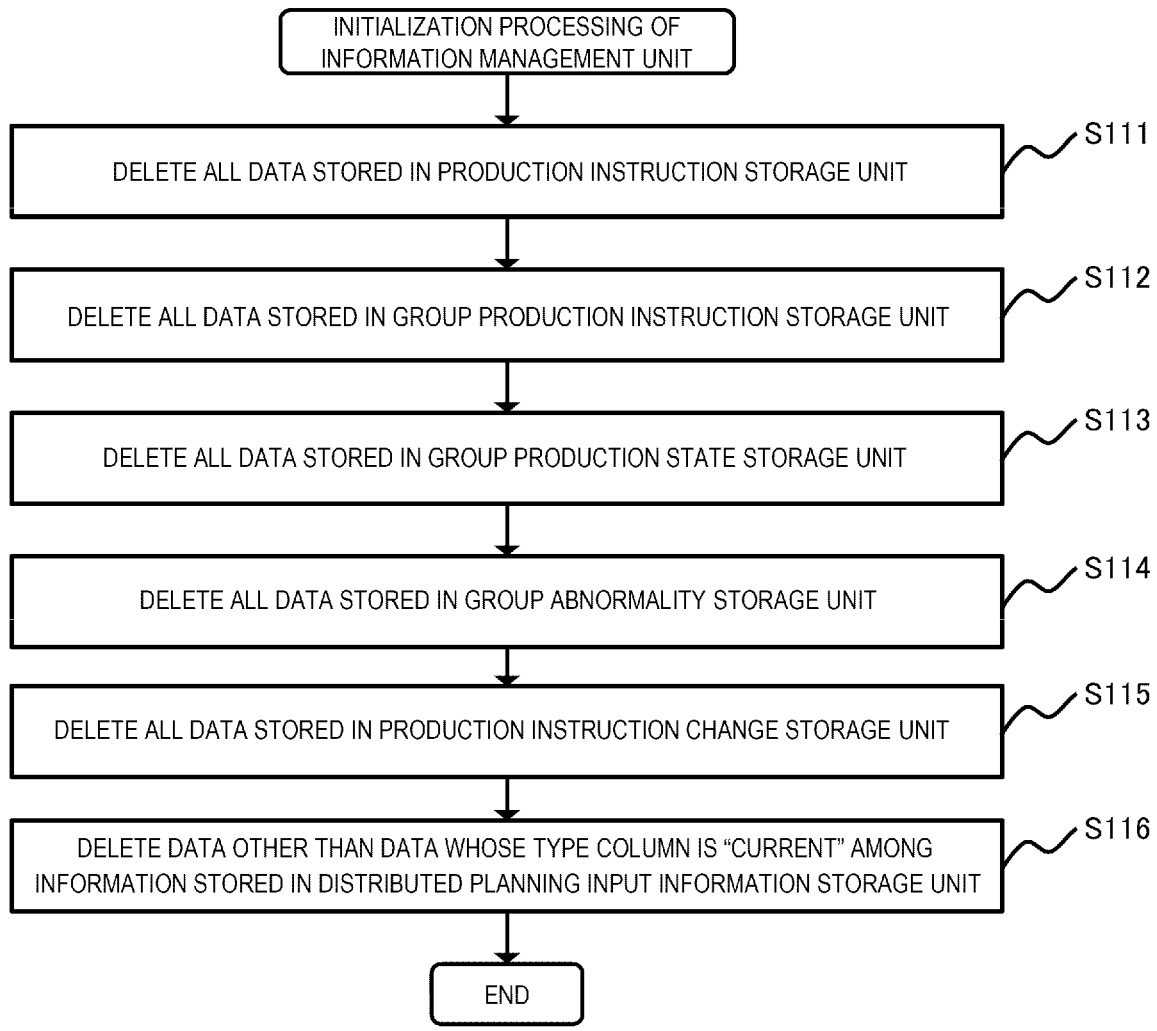

[FIG. 13]
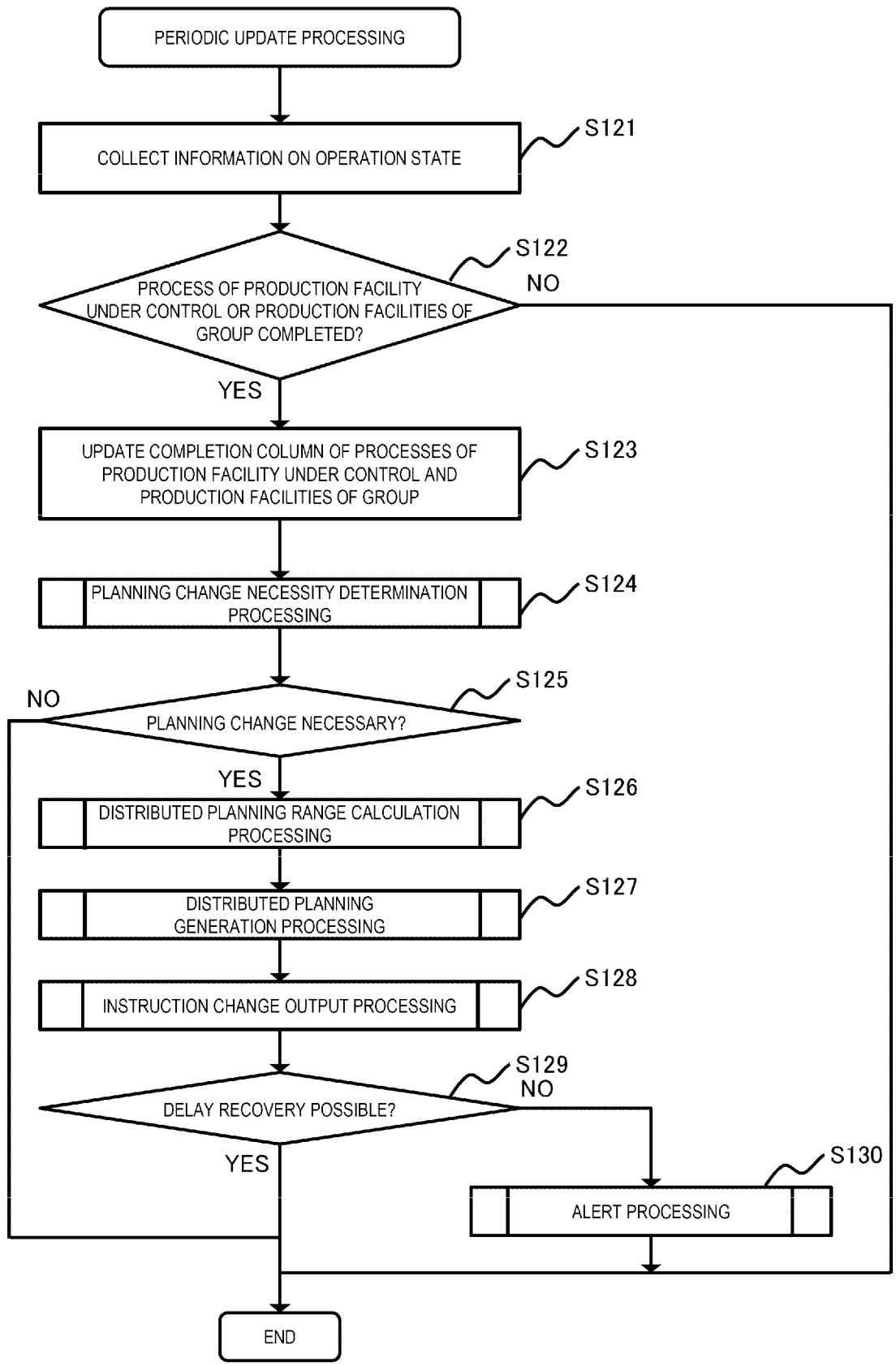

[FIG. 14]
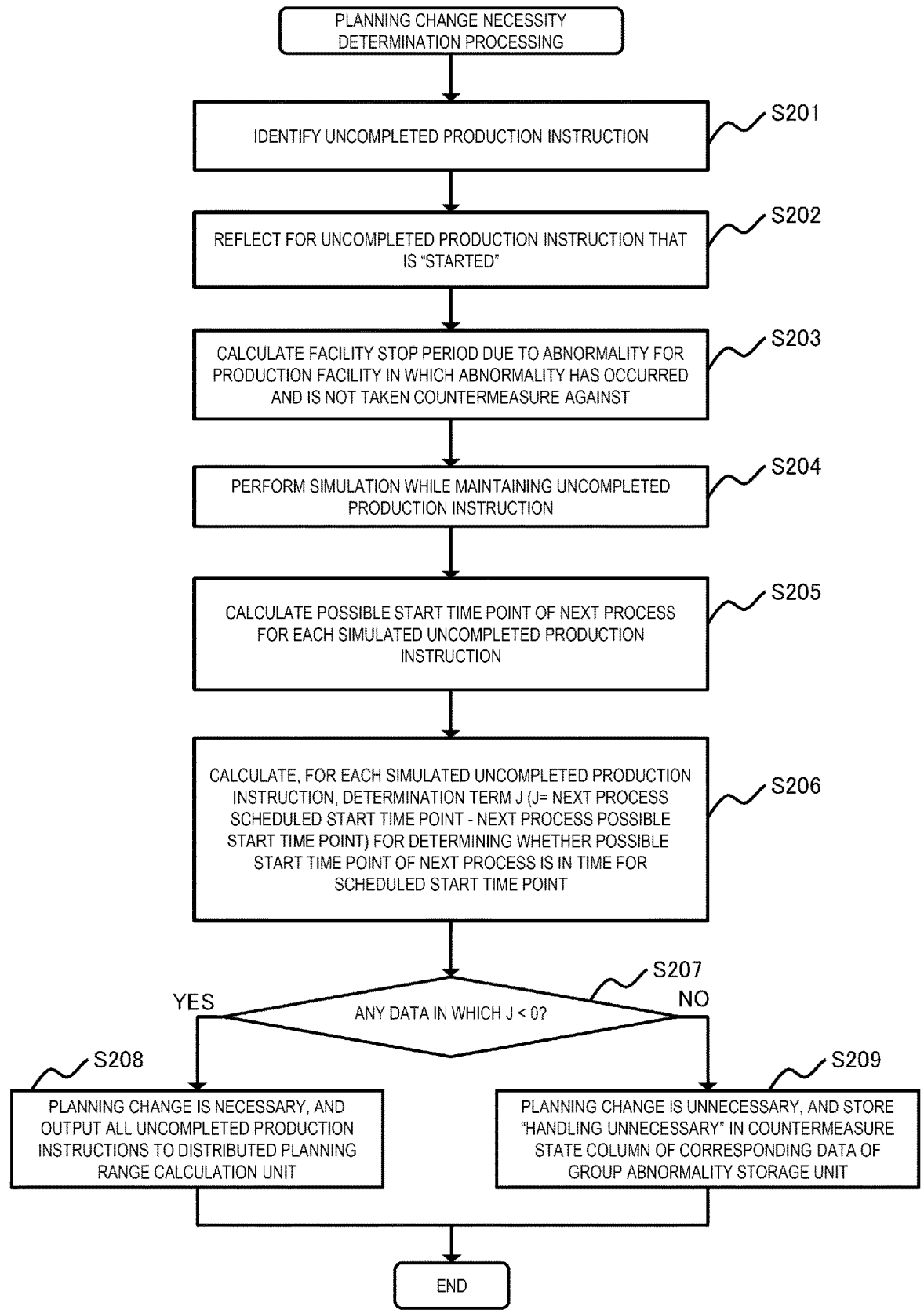

[FIG. 15]
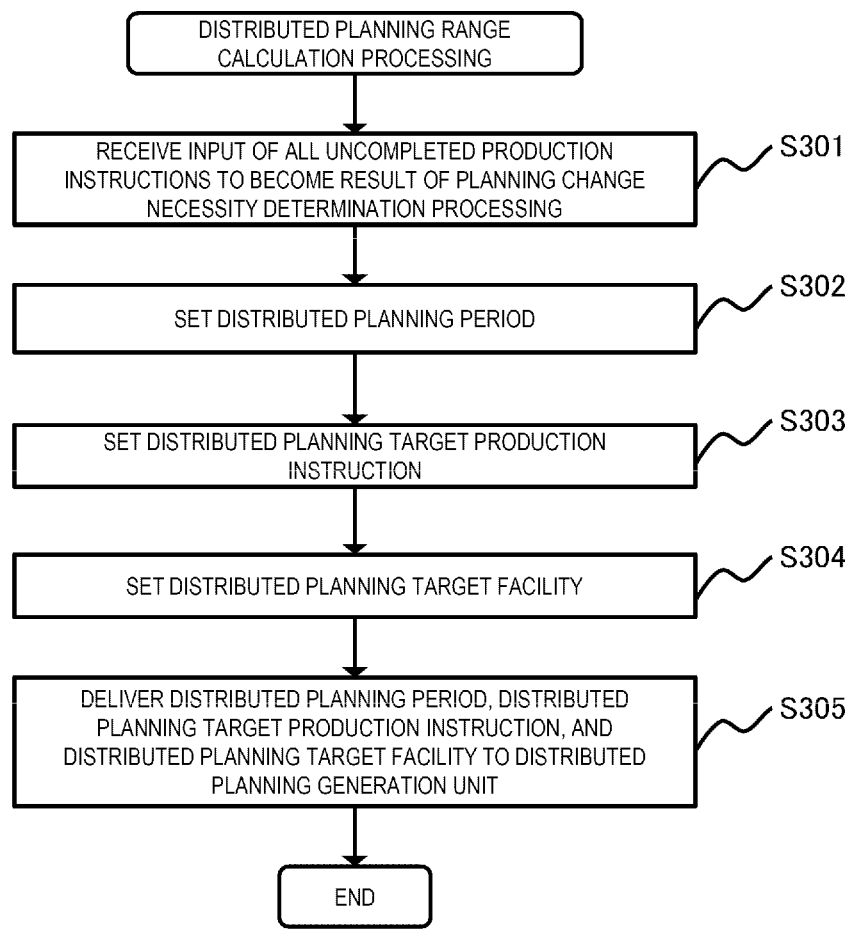

[FIG. 16]
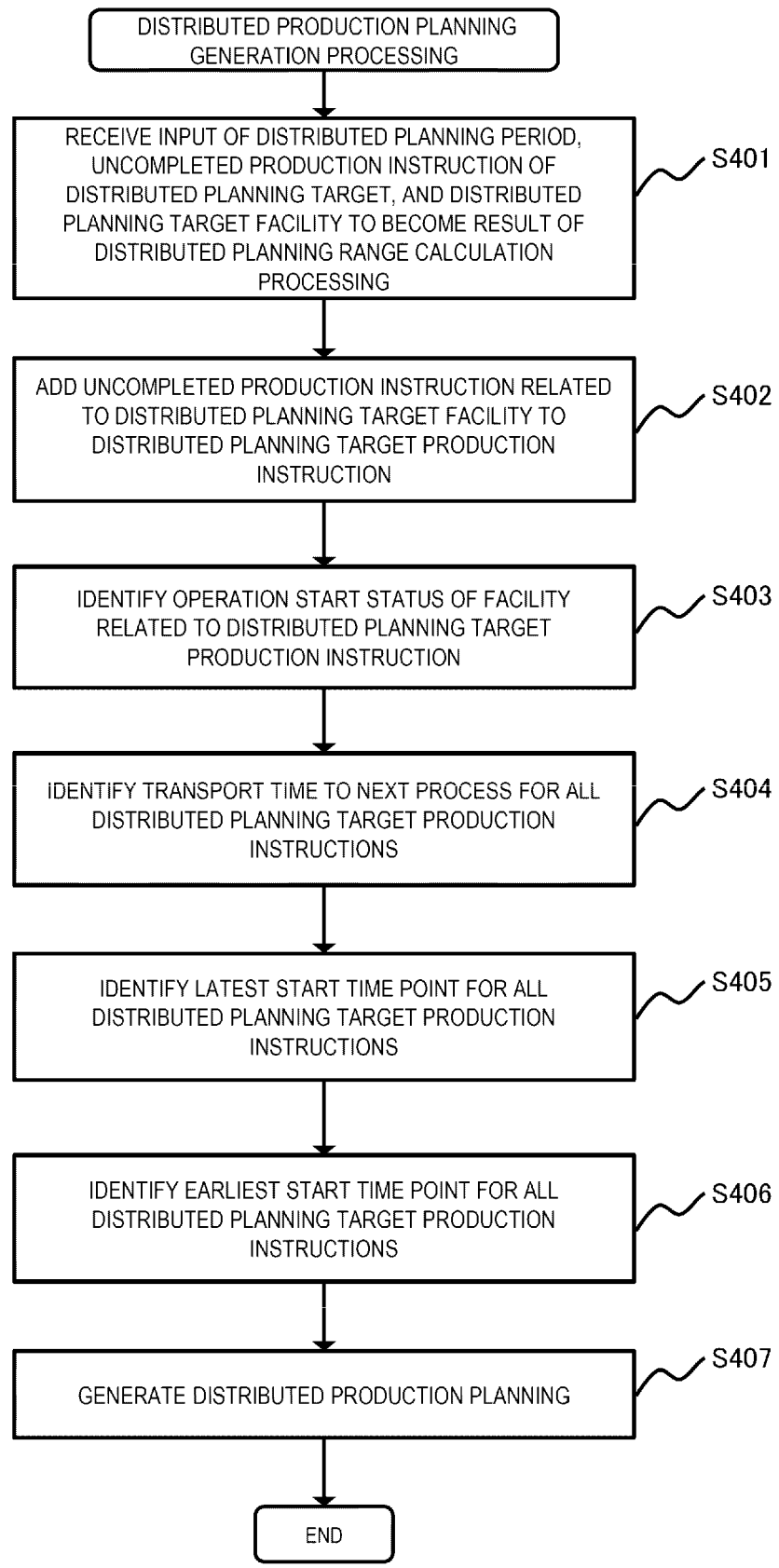

[FIG. 17]
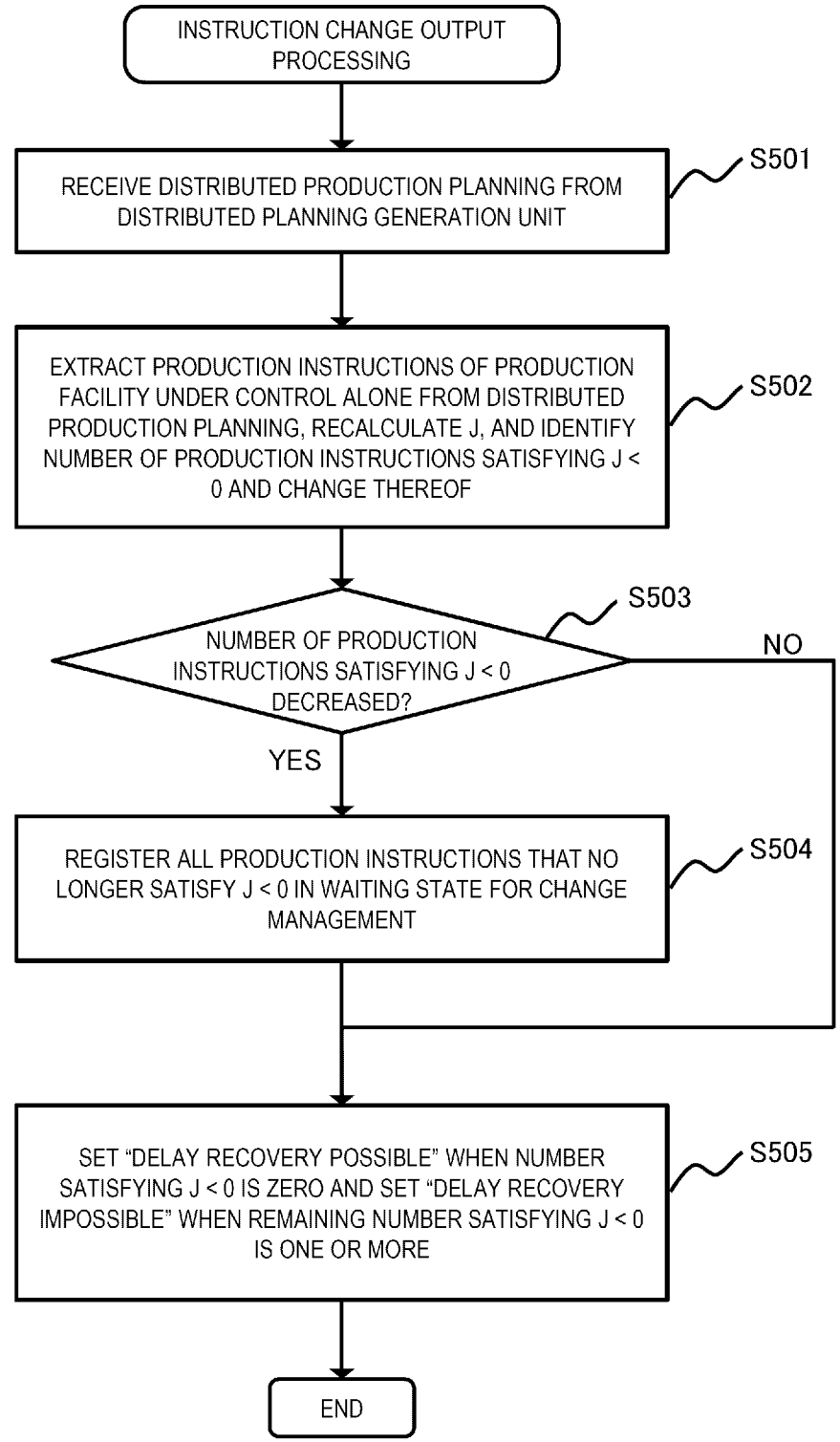

[FIG. 18]
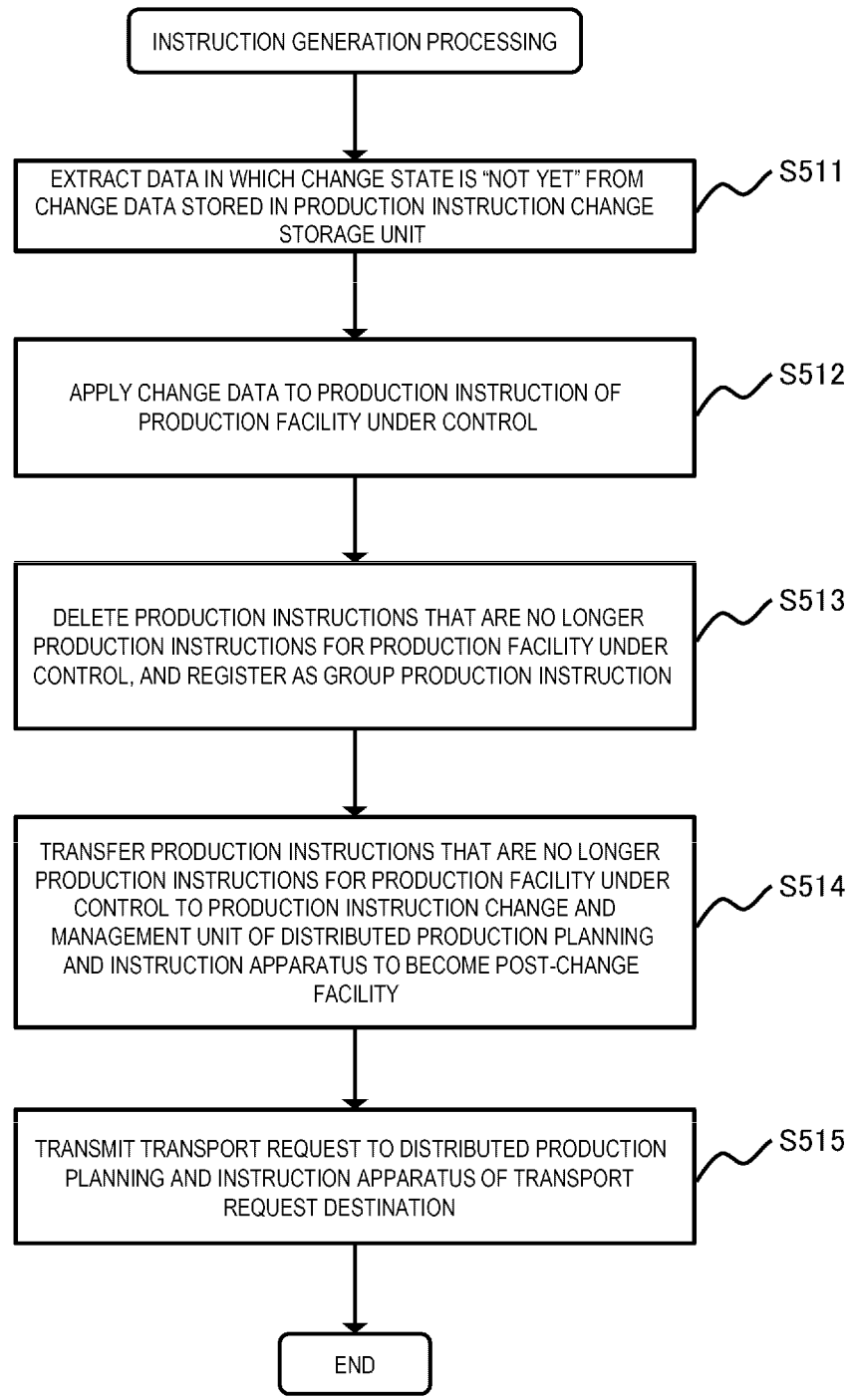

[FIG. 19]
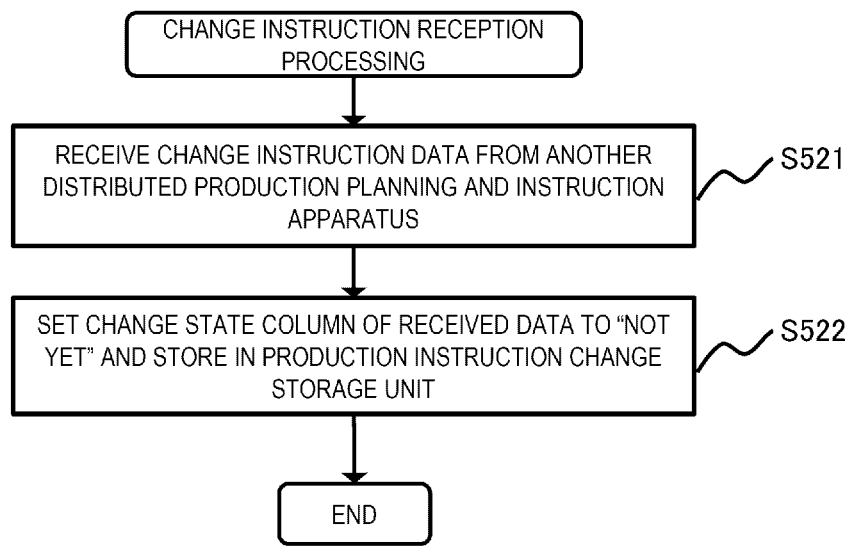

[FIG. 20]
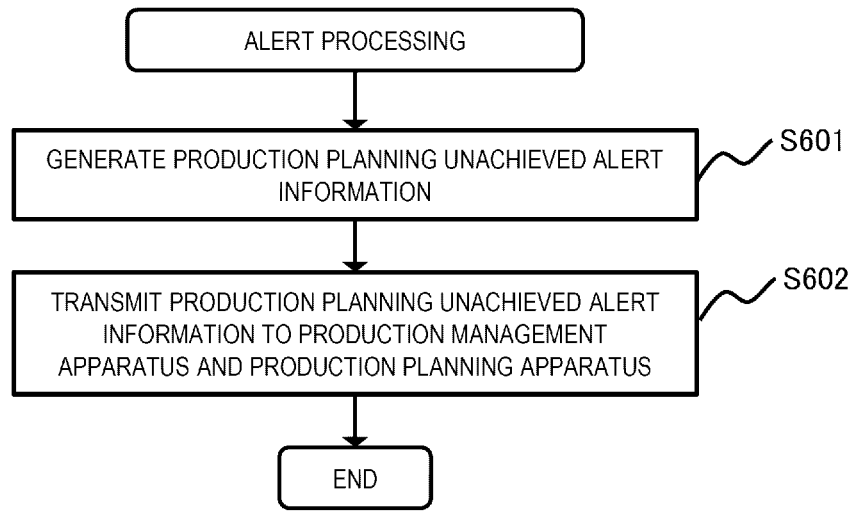

[FIG. 21]
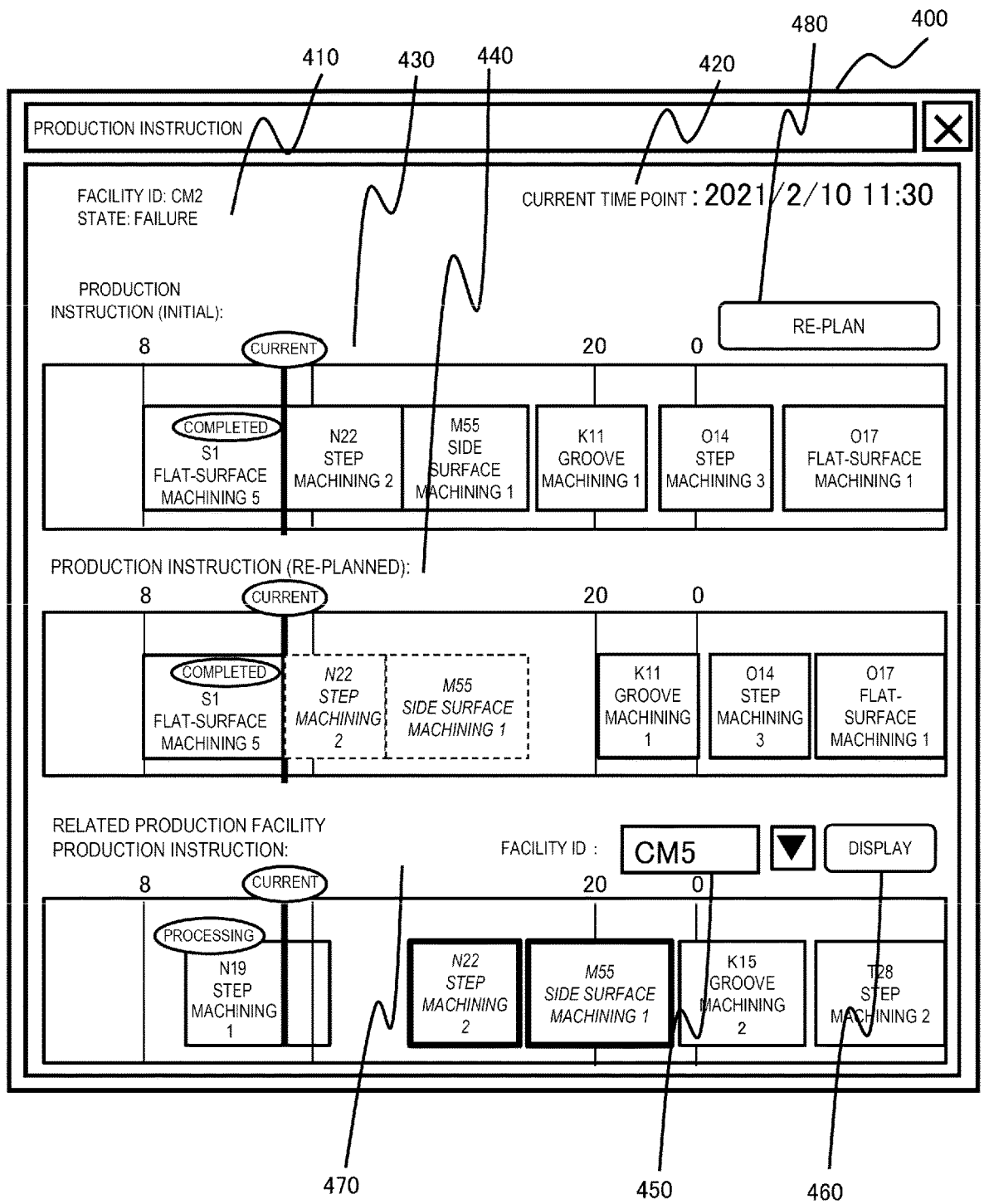

DISTRIBUTED PRODUCTION PLANNING AND INSTRUCTION APPARATUS AND DISTRIBUTED PRODUCTION PLANNING AND INSTRUCTION SYSTEM

CROSS-REFERENCE TO RELATED APPLICATION

The present application claims priority from Japanese application JP2021-74902, filed on Apr. 27, 2021, the contents of which is hereby incorporated by reference into this application.

TECHNICAL FIELD

The present invention relates to a distributed production planning and instruction apparatus and a distributed production planning and instruction system.

BACKGROUND ART

PTL 1 describes "a production system comprising: an actual production unit (1) including a plurality of production facilities that produce products on the basis of a given production planning; and a production management unit (3) that provides an optimized production planning to the actual production unit, manages a predicted result and an actual result of the production planning by the real production unit in real time, and, when it is determined that an execution condition of re-planning is satisfied, re-plans the production planning so as to optimize the production planning and provides the re-planned production plan to the actual production unit".

CITATION LIST

Patent Literature

PTL 1: JP-A-2020-98541

SUMMARY OF INVENTION

Technical Problem

In the technique described in the above PTL 1, when a difference occurs between the production planning and a performance, necessity of re-planning is determined on the basis of a degree of the difference. When re-planning is necessary, the production planning is re-planned using a production simulator and the re-planned production planning can be allocated to each production facility, that is, can be transmitted to a manufacturing site as a production instruction. However, the technique has not disclosed appropriately setting a condition for determining necessity of re-planning.

An object of the invention is to appropriately set a condition for determining necessity of re-planning.

Solution to Problem

In order to solve the above problem, the present application employs, for example, a technique described in the claims. The invention includes a plurality of means for solving the above problems, and an example thereof is a distributed production planning and instruction apparatus. The apparatus includes: a storage unit configured to store a production instruction serving as an operation instruction for a production element including a production facility of a factory, a production resource, and an operator, production state information including an occurrence state of an abnormality of the production element, and facility-process relation information for identifying, for each process to be performed by the production element, another production element capable of alternatively performing the process; a planning change necessity determination unit configured to, when an abnormality in execution of the production instruction occurs in the production element, determine that planning change is unnecessary in a case where the production instruction can be complied in consideration of a stop period of the production element that is caused by the abnormality; a distributed planning range calculation unit configured to include the another alternative production element in a re-planning target range; and a distributed planning generation unit configured to re-plan the production instruction within the generated re-planning target range.

Advantageous Effect

According to the invention, it is possible to provide a technique for appropriately setting a condition for determining necessity of re-planning.

Problems to be solved, configurations, and effects other than those described above will be apparent from the description of the following embodiments.

BRIEF DESCRIPTION OF DRAWINGS

FIG. 1 is a diagram illustrating a configuration example of a distributed production planning and instruction system.

FIG. 2 is a diagram illustrating a configuration example of a distributed production planning and instruction apparatus.

FIG. 3 is a diagram illustrating a data configuration example of a production instruction storage unit.

FIG. 4 is a diagram illustrating a data configuration example of a group production instruction storage unit.

FIG. 5 is a diagram illustrating a data configuration example of a group production state storage unit.

FIG. 6 is a diagram illustrating a data configuration example of a group abnormality storage unit.

FIG. 7 is a diagram illustrating a data configuration example of a facility-process relation storage unit.

FIG. 8 is a diagram illustrating a data configuration example of a production instruction change storage unit.

FIG. 9 is a diagram illustrating a data configuration example of a distributed planning input information storage unit.

FIG. 10 is a diagram illustrating a hardware configuration example of the distributed production planning and instruction apparatus.

FIG. 11 is a diagram illustrating an example of a flow of a production instruction update processing.

FIG. 12 is a diagram illustrating an example of a flow of an initialization processing of an information management unit.

FIG. 13 is a diagram illustrating an example of a flow of a periodic update processing.

FIG. 14 is a diagram illustrating an example of a flow of a planning change necessity determination processing.

FIG. 15 is a diagram showing an example of a flow of a distributed planning range calculation processing.

FIG. 16 is a diagram showing an example of a flow of a distributed planning generation processing.

FIG. 17 is a diagram illustrating an example of a flow of an instruction change output processing.

FIG. 18 is a diagram illustrating an example of a flow of an instruction generation processing.

FIG. 19 is a diagram illustrating an example of a flow of a change instruction reception processing.

FIG. 20 is a diagram illustrating an example of a flow of an alert processing.

FIG. 21 is a diagram illustrating an example of a display screen of the distributed production planning and instruction apparatus.

DESCRIPTION OF EMBODIMENTS

In the following embodiments, description may be divided into plural sections or embodiments when necessary for convenience. Unless particularly specified, the sections or embodiments are not independent of each other, but have a relation such that one is a modification, detailed description, supplementary description, or the like of a part or all of the others.

In the following embodiments, when a number or the like (including a number, a numeric value, an amount, a range, and the like) of an element is referred to, the number or the like is not limited to a specific number, and may be equal to, greater than or less than the specific number, unless otherwise specified or clearly limited to the specific number in principle.

Further, in the embodiments described below, it is needless to say that the constituent elements (including element steps) are not always essential unless otherwise stated or considered as apparently essential in principle.

Similarly, in the following embodiments, when reference is made to shapes, positional relations, and the like of the constituent elements or the like, those having substantially approximate or similar shapes or the like are inclusive unless otherwise particularly specified or considered to be clearly not inclusive in principle. The same applies to numeric values and ranges.

In all the drawings for illustrating the embodiments, the same members are denoted by the same reference signs in principle, and repetitive descriptions thereof will be omitted. However, a different reference sign or name may be given to the same member when a name shared by members before and after a change due to an environmental change or the like is highly probable to cause confusion. Hereinafter, each embodiment of the invention will be described with reference to the drawings.

In general, when a difference occurs between a production planning and a production performance, necessity of re-planning is determined in accordance with a degree of this difference. When a condition for determining necessity of re-planning is set loosely, the re-planning probably cannot be performed at a necessary timing, which harms future production. On the other hand, when the condition is set strictly, the re-planning may be performed at a high frequency, which causes disorder in the manufacturing site.

In a factory or a manufacturing line, an embodiment according to the invention detects an influence of a site situation, which changes in time series, on future production with respect to elements such as a production facility, a production resource, and an operator, and determines a condition for determining the necessity of the re-planning for each production facility. When the re-planning is necessary, the production planning is re-planned by localizing a re-planning period and a target range such as a target facility and a target process, and a production instruction based on the re-planned production planning is issued. Accordingly, even when the condition for determining the necessity of the re-planning is strict, the influence of planning change and instruction change can be localized.

In the following description, an "input unit", an "output unit", and an "interface device" may be one or more interface devices. The one or more interface devices may be at least one of the following.

One or more input/output (I/O) interface devices. The I/O interface device is an interface device for at least one of an I/O device or a remote display computer. The I/O interface device for the display computer may be a communication interface device. At least one I/O device may be a user interface device, for example, either an input device such as a keyboard and a pointing device or an output device such as a display device.

One or more communication interface devices. The one or more communication interface devices may be one or more communication interface devices of the same type (for example, one or more network interface cards (NIC)) or may be two or more communication interface devices of different types (for example, an NIC and a host bus adapter (HBA)).

In the following description, "memory" is one or more memory devices as an example of one or more storage devices, and may typically be a main storage device. At least one memory device in the memory may be a volatile memory device or a non-volatile memory device.

In the following description, a "persistent storage device" may be one or more persistent storage devices as an example of one or more storage devices. Typically, the persistent storage device may be a non-volatile storage device (for example, an auxiliary storage device), and may specifically be, for example, a hard disk drive (HDD), a solid state drive (SSD), a non-volatile memory express (NVME) drive, or a storage class memory (SCM).

In the following description, a "storage unit" or a "storage device" may be a memory or both of a memory and a persistent storage device.

In the following description, a "processing unit" or a "processor" may be one or more processor devices. Typically, at least one processor device may be a microprocessor device such as a central processing unit (CPU), and may also be a processor device of another type such as a graphics processing unit (GPU). At least one processor device may be a single-core processor device or a multi-core processor device. At least one processor device may be a processor core. At least one processor device may be a processor device in a broad sense, such as a circuit (for example, a field-programmable gate array (FPGA), a complex programmable logic device (CPLD), or an application specific integrated circuit (ASIC)) which is a collection of gate arrays in a hardware description language that performs a partial or entire processing.

In the following description, the expression "yyy unit" may be used to describe a function. The function may be implemented by a processor executing one or more computer programs, or may be implemented by one or more hardware circuits (for example, an FPGA or an ASIC), or may be implemented by a combination thereof. When the function is implemented by a processor executing a program, since a predetermined processing is executed by appropriately using a storage device and/or an interface device, the function may be at least a part of the processor. The processing described using the function as a subject may be a processing performed by a processor or by a device including the processor. The program may be installed from a program source. The program source may be, for example, a program distribution computer or a recording medium (for example, a non-transitory recording medium) readable by a computer. The description for each function is an example, and a plurality of functions may be combined into one function, or one function may be divided into a plurality of functions.

In the following description, processing may be described using a "program" or a "processing unit" as a subject. Alternatively, the processing described using the program as a subject may be a processing performed by a processor or by a device including the processor. Two or more programs may be implemented as one program, or one program may be implemented as two or more programs.

In the following description, the expression "xxx table" may be used to describe information for acquiring an output for an input. The information may be a table of any structure, or may be a learning model that generates an output for an input, such as a neural network, a genetic algorithm, and a random forest. Therefore, "xxx table" can be referred to as "xxx information". Further, in the following description, a configuration of each table is an example, and one table may be divided into two or more tables, or two or more tables may partially or entirely be one table.

In the following description, a "distributed production planning and instruction system" may be a system including one or more physical computers or a system (for example, a cloud computing system) implemented on a physical calculation resource group (for example, a cloud computing platform). "Displaying" display information by the distributed production planning and instruction system may be displaying the display information on a display device included in a computer, or may be transmitting the display information from the computer to a display computer (in the latter case, the display information is displayed by the display computer).

FIG. 1 is a diagram illustrating a configuration example of a distributed production planning and instruction system. A distributed production planning and instruction system 10 includes a production site apparatus group that is provided in a manufacturing site (area) 300, a production management apparatus 200 and a production planning apparatus 210 that are provided outside the manufacturing site and is communicably connected to the manufacturing site via a network.

The production site apparatus group includes a plurality of production facilities such as a production facility 340, a production facility 350, a production facility 360 . . . , a performance input terminal 310 provided in a predetermined unit, production instruction terminals 320 and distributed production planning and instruction apparatuses 100 that are respectively set for the production facilities and display an operation instruction and the like, and other devices. These terminals and devices are communicably connected with each other via a network 370.

The network 370 is, for example, any one or a combination of a communication network using a part or all of a general public line such as a local area network (LAN), a wide area network (WAN), a virtual private network (VPN), and the Internet, a mobile phone communication network, and the like. The network 370 may be a wireless communication network such as Wi-Fi (registered trademark) or 5th Generation (5G).

The performance input terminal 310 receives input by an operator of performance information such as an identifier of an individual to be manufactured and a start time point and an end time point of a process, and transmits the performance information to the production management apparatus 200. The production instruction terminal 320 is a terminal that is operated by the operator to display production instruction information generated by the distributed production planning and instruction apparatus 100, receive an operation input on the screen, and change a display content.

The production management apparatus 200 collects and manages production performance information, collects and manages facility information, collects and manages operator information, and transfers such information to the distributed production planning and instruction apparatus 100 in accordance with a request from the distributed production planning and instruction apparatus 100. The distributed production planning and instruction apparatus 100 may request and receive data and the like from a manufacturing executing system (MES) (not shown) connected to a network, instead of the production management apparatus 200.

The production planning apparatus 210 creates future production planning data by using information such as a manufacturing flow for each variety, a production facility list of the factory, a maintenance planning, a list of facility charged by an operator, a shift planning of the operator, master information including an operation calendar of the factory and the like, in-process manufactured object information at a planning date and time, and input planning for the factory. Then, the production planning apparatus 210 delivers the created production planning data to the distributed production planning and instruction apparatus. The distributed production planning and instruction apparatus 100 may receive the production planning data and the like from an MES (not shown) connected to a network, instead of the production planning apparatus 210.

The distributed production planning and instruction apparatus 100 is arranged in a production site per unit of production facility, or per unit of production resource in operation area without using production facilities. Each distributed production planning and instruction apparatus 100 requests and acquires the production planning data from the production planning apparatus 210. The distributed production planning and instruction apparatus 100 uses a production instruction relating to the production facility 340 provided with the apparatus, a production instruction of a related facility to be used, production progress information acquired from the production management apparatus 200, and abnormality information acquired from the production facility 340 to perform processing such as change necessity determination of the production instruction of the current production facility, identification of a re-planning range, generation of the re-planning, and instruction reflection.

In particular, when a production delay occurs due to an abnormality or the like occurring in the production facility 340 under control, the distributed production planning and instruction apparatus 100 uses master data of a relation between the production facility and the process of the current production facility 340, change information of the production instruction by the re-planning, and various types of information used for re-planning to perform processing of the change necessity determination of the production instruction of the current production facility, the identification of the re-planning range, the generation of the re-planning, and the instruction reflection.

The distributed production planning and instruction apparatus 100 includes, as information, a distributed planning input information storage unit 117, a production instruction storage unit 111, a group production instruction storage unit 112, a group production state storage unit 113, a group abnormality storage unit 114, a facility-process relation storage unit 115, and a production instruction change storage unit 116. The distributed planning input information storage unit 117, the production instruction storage unit 111, the group production instruction storage unit 112, the group production state storage unit 113, the group abnormality storage unit 114, the facility-process relation storage unit 115, the production instruction change storage unit 116 are managed by an information management unit 121.

Further, the distributed production planning and instruction apparatus 100 includes, as processing units, the information management unit 121, a planning change necessity determination unit 122, a distributed planning range calculation unit 123, a distributed planning generation unit 124, a production instruction change and management unit 125, and an alert information management unit 126. Among these processing units, in particular, the production instruction change and management unit 125 transmits a changed production instruction to another distributed production planning and instruction apparatus 100 having change via the network 370 and locally changes the production planning.

FIG. 2 is a diagram illustrating a configuration example of the distributed production planning and instruction apparatus. The distributed production planning and instruction apparatus 100 includes a storage unit 110, a processing unit 120, a communication unit 130, an input unit 140, and an output unit 150.

The storage unit 110 includes the production instruction storage unit 111, the group production instruction storage unit 112, the group production state storage unit 113, the group abnormality storage unit 114, the facility-process relation storage unit 115, the production instruction change storage unit 116, and the distributed planning input information storage unit 117.

The production instruction storage unit 111 stores a production instruction for the target production facility 340 or production resource in a production area that is provided with the distributed production planning and instruction apparatus 100.

FIG. 3 is a diagram illustrating a data configuration example of the production instruction storage unit. The production instruction storage unit 111 stores information acquired from the production planning apparatus 210 by the information management unit 121 described later.

The production instruction storage unit 111 includes a facility ID column 111a, a manufactured object ID column 111b, a variety ID column 111c, a number column 111d, a process ID column 111e, a process No column 111f, a scheduled start time point column 111g, a scheduled end time point column 111h, a next process scheduled start time point column 111j, a next process facility ID column 111k, and a complete column 111m.

The facility ID column 111a, the manufactured object ID column 111b, the variety ID column 111c, the number column 111d, the process ID column 111e, the process No column 111f, the scheduled start time point column 111g, the scheduled end time point column 111h, the next process scheduled start time point column 111j, the next process facility ID column 111k, and the completion column 111m are associated with one another.

The facility ID column 111a stores a facility ID, which is identification information for uniquely identifying a production facility or a production resource in a production area.

The manufactured object ID column 111b stores a manufactured object ID, which is identification information for uniquely identifying each manufactured object such as a product or a component instructed to be processed by the production facility identified in the facility ID column 111a.

The variety ID column 111c stores information for identifying the variety of the manufactured object identified in the manufactured object ID column 111b.

The number column 111d stores information for identifying the quantity of the manufactured object identified in the manufactured object ID column 111b.

The process ID column 111e stores information for identifying an instructed process for processing the manufactured object identified in the manufactured object ID column 111b by the production facility identified in the facility ID column 111a.

The process No column 111f stores information for identifying an order, counting from a first process, of the process in the process ID column 111e related to the manufactured object identified in the manufactured object ID column 111b.

The scheduled start time point column 111g stores, as a production instruction, information for identifying a scheduled time point at which the process identified in the process ID column 111e is to be started for the manufactured object identified in the manufactured object ID column 111b in the production facility identified in the facility ID column 111a.

The scheduled end time point column 111h stores, as a production instruction, information for identifying a scheduled time point at which the process identified in the process ID column 111e is to be completed for the manufactured object identified in the manufactured object ID column 111b in the production facility identified in the facility ID column 111a.

The next process scheduled start time point column 111j stores, as a production instruction, information for a scheduled time point at which a process next to the process identified in the process ID column 111e is to be started for the manufactured object identified in the manufactured object ID column 111b.

The next process facility ID column 111k stores, as a production instruction, information for identifying a scheduled production facility that is to perform a process next to the process identified in the process ID column 111e for the manufactured object identified in the manufactured object ID column 111b.

The completion column 111m stores information for identifying whether the process identified in the process ID column 111e is completed for the manufactured object identified in the manufactured object ID column 111b in the production facility identified in the facility ID column 111a. When the process is not completed, the completion column 111m is blank.

Return to the description on FIG. 2. The group production instruction storage unit 112 stores the production instruction of the target production facility or production resource in the production area that is provided with the distributed production planning and instruction apparatus 100, and a production instruction related to the re-planning for recovering a delay in the production planning. The group production instruction storage unit 112 may store production instructions for a plurality of production facilities or production resources in the production area, and the information management unit 121 described later extracts the target production facilities or production areas.

FIG. 4 is a diagram illustrating a data configuration example of the group production instruction storage unit. The group production instruction storage unit 112 stores information acquired from the production planning apparatus 210 by the information management unit 121 described later.

The group production instruction storage unit 112 includes a facility ID column 112a, a manufactured object ID column 112b, a variety ID column 112c, a number column 112d, a process ID column 112e, a process No column 112f, a scheduled start time point column 112g, a scheduled end time point column 112h, a next process scheduled start time point column 112j, a next process facility ID column 112k, and a completion column 112m.

The facility ID column 112a, the manufactured object ID column 112b, the variety ID column 112c, the number column 112d, the process ID column 112e, the process No column 112f, the scheduled start time point column 112g, the scheduled end time point column 112h, the next process scheduled start time point column 112j, the next process facility ID column 112k, and the completion column 112m are associated with one another.

The facility ID column 112a stores a facility ID, which is identification information for uniquely identifying a production facility or a production resource in a production area.

The manufactured object ID column 112b stores a manufactured object ID, which is identification information for uniquely identifying each manufactured object such as a product or a component instructed to be processed by the production facility identified in the facility ID column 112a.

The variety ID column 112c stores information for identifying the variety of the manufactured object identified in the manufactured object ID column 112b.

The number column 112d stores information for identifying the quantity of the manufactured object identified in the manufactured object ID column 112b.

The process ID column 112e stores information for identifying an instructed process for processing the manufactured object identified in the manufactured object ID column 112b by the production facility identified in the facility ID column 112a.

The process No column 112f stores information for identifying an order, counting from a first process, of the process in the process ID column 112e related to the manufactured object identified in the manufactured object ID column 112b.

The scheduled start time point column 112g stores, as a production instruction, information for identifying a scheduled time point at which the process identified in the process ID column 112e is to be started for the manufactured object identified in the manufactured object ID column 112b in the production facility identified in the facility ID column 112a.

The scheduled end time point column 112h stores, as a production instruction, information for identifying a scheduled time point at which the process identified in the process ID column 112e is to be completed for the manufactured object identified in the manufactured object ID column 112b in the production facility identified in the facility ID column 112a.

The next process scheduled start time point column 112j stores, as a production instruction, information for a scheduled time point at which a process next to the process identified in the process ID column 112e is to be started for the manufactured object identified in the manufactured object ID column 112b.

The next process facility ID column 112k stores, as a production instruction, information for identifying a scheduled production facility that is to perform a process next to the process identified in the process ID column 112e for the manufactured object identified in the manufactured object ID column 112b.

The completion column 112m stores information for identifying whether the process identified in the process ID column 112e is completed for the manufactured object identified in the manufactured object ID column 112b in the production facility identified in the facility ID column 112a. When the process is not completed, the completion column 112m is blank.

Return to the description on FIG. 2. The group production state storage unit 113 stores information on the production state for the target production facility or production resource in the production area that is provided with the distributed production planning and instruction apparatus 100, and the production facility or the production resource in the production area related to the re-planning for recovering the delay in the production planning.

FIG. 5 is a diagram illustrating a data configuration example of the group production state storage unit. The group production state storage unit 113 stores information acquired by the information management unit 121 described later from the production management apparatus 200 and the target production facility that is provided with the distributed production planning and instruction apparatus 100, and information generated using the acquired information.

The group production state storage unit 113 includes a facility ID column 113a, a state column 113b, a manufactured object ID column 113c, a variety ID column 113d, a number column 113e, a process ID column 113f, a process No column 113g, a start time point column 113h, and a scheduled end time point column 113j.

The facility ID column 113a, the state column 113b, the manufactured object ID column 113c, the variety ID column 113d, the number column 113e, the process ID column 113f, the process No column 113g, the start time point column 113h, and the scheduled end time point column 113j are associated with one another.

The facility ID column 113a stores a facility ID, which is identification information for uniquely identifying a production facility or a production resource in a production area.

The state column 113b stores information on a state (mainly an operation state) of the production facility identified in the facility ID column 113a.

The manufactured object ID column 113c stores a manufactured object ID, which is identification information for uniquely identifying each manufactured object such as a product or a component instructed being processed by the production facility identified in the facility ID column 113a. The manufactured object ID column 113c may be blank depending on a value stored in the state column 113b.

The variety ID column 113d stores information for identifying the variety of the manufactured object identified in the manufactured object ID column 113c. The variety ID column 113d may be blank depending on the value stored in the state column 113b.

The number column 113e stores information for identifying the quantity of the manufactured object identified in the manufactured object ID column 113c. The number column 113e may be blank depending on the value stored in the state column 113b.

The process ID column 113f stores information for identifying the process instructed to process the manufactured object identified in the manufactured object ID column 113c in the production facility identified in the facility ID column 113a. The process ID column 113f may be blank depending on the value stored in the state column 113b.

The process No column 113g stores information for identifying an order, counting from a first process, of the process in the process ID column 113f related to the manufactured object identified in the manufactured object ID column 113c. The process No column 113g may be blank depending on the value stored in the state column 113b.

The start time point column 113*h* stores, as a production instruction, information for identifying a time point at which the process identified in the process ID column 113*f* is started for the manufactured object identified in the manufactured object ID column 113*c* in the production facility identified in the facility ID column 113*a*. The start time point column 113*h* may be blank depending on the value stored in the state column 113*b*.

The scheduled end time point column 113*j* stores, as a production instruction, information for identifying a scheduled time point at which the process identified in the process ID column 113*f* is to be completed for the manufactured object identified in the manufactured object ID column 113*c* in the production facility identified in the facility ID column 113*a*. The scheduled end time point column 113*j* may be blank depending on the value stored in the state column 113*b*.

Return to the description on FIG. 2. The group abnormality storage unit 114 stores information on an abnormality for the target production facility or production resource in the production area that is provided with the distributed production planning and instruction apparatus 100, and for the production facility or the production resource in the production area related to the re-planning for recovering the delay in the production planning.

FIG. 6 is a diagram illustrating a data configuration example of the group abnormality storage unit. The group abnormality storage unit 114 stores information acquired by the information management unit 121 described later from the production management apparatus 200 and the target production facility that is provided with the distributed production planning and instruction apparatus 100, and information generated using the acquired information.

The group abnormality storage unit 114 includes a facility ID column 114*a*, an abnormality state column 114*b*, an occurrence time point column 114*c*, a scheduled recovery time point column 114*d*, and a countermeasure state column 114*e*.

The facility ID column 114*a*, the abnormality state column 114*b*, the occurrence time point column 114*c*, the scheduled recovery time point column 114*d*, and the countermeasure state column 114*e* are associated with one another.

The facility ID column 114*a* stores a facility ID, which is identification information for uniquely identifying a production facility or a production resource in a production area.

The abnormality state column 114*b* stores information on a state of an abnormality of the facility identified in the facility ID column 114*a*. The state of the abnormality includes, for example, a reason why the abnormality occurs, such as "failure" or "inspection".

The occurrence time point column 114*c* stores information for identifying a time point at which the abnormality identified in the abnormality state column 114*b* occurs in the facility identified in the facility ID column 114*a*.

The scheduled recovery time point column 114*d* stores information for identifying a scheduled time point at which the abnormality identified in the abnormal state column 114*b* occurring at the time point identified in the occurrence time point column 114*c* is to be eliminated in the facility identified in the facility ID column 114*a* and the facility identified in the facility ID column 114*a* is to return to a normal state.

The countermeasure state column 114*e* stores information on a handling status of the abnormality identified in the abnormality state column 114*b* and occurring at the time point identified in the occurrence time point column 114*c* in the production facility identified in the facility ID column 114*a*. The handling status includes, for example, an execution status of a countermeasure for recovering from the abnormality, such as "not yet (not handled)" or "unnecessary (countermeasure unnecessary)".

Return to the description on FIG. 2. The facility-process relation storage unit 115 stores, for each combination of the variety to be produced and the process thereof, production facilities or production resources in production areas capable of performing the process, in association with one another.

FIG. 7 is a diagram illustrating a data configuration example of the facility-process relation storage unit. The facility-process relation storage unit 115 stores information acquired by the information management unit 121 from the production management apparatus 200 or the production planning apparatus 210 described later, as information on the target production facility that is provided with the distributed production planning and instruction apparatus 100. When a change occurs in the production facility, the information is updated.

The facility-process relation storage unit 115 includes a variety ID column 115*a*, a process ID column 115*b*, and a facility column 115*c* including a plurality of facility IDs.

The variety ID column 115*a*, the process ID column 115*b*, and the facility column 115*c* are associated with one another.

The variety ID column 115*a* stores information for identifying the variety of the manufactured object. The process ID column 115*b* stores information for identifying the process. The facility column 115*c* stores information for identifying a production facility capable of performing the process identified in the process ID column 115*b* for the variety identified in the variety ID column 115*a*. The facility column 115*c* is further subdivided for each production facility. For example, in the present embodiment, the facility column 115*c* includes the facility IDs of all the production facilities capable of performing the process, such as a facility ID 1 column 115*d*, a facility ID 2 column 115*e*, and a facility ID 3 column 115*f*.

Return to the description on FIG. 2. The production instruction change storage unit 116 stores information on change of the production instruction for the target production facility or production resource in the production area that is provided with the distributed production planning and instruction apparatus 100.

FIG. 8 is a diagram illustrating a data configuration example of the production instruction change storage unit. The production instruction change storage unit 116 stores information on a production instruction change generated by the production instruction change and management unit 125 on the basis of a schedule generated by the distributed planning generation unit 124 described later. In addition, the production instruction change storage unit 116 stores information on a production instruction received from another distributed production planning and instruction apparatus 100 by the production instruction change and management unit 125.

The production instruction change storage unit 116 includes a pre-change facility ID column 116*a*, a post-change facility ID column 116*b*, a manufactured object ID column 116*c*, a variety ID column 116*d*, a number column 116*e*, a process ID column 116*f*, a process No column 116*g*, a scheduled start time point column 116*h*, a scheduled end time point column 116*j*, a next process scheduled start time point column 116*k*, a next process facility ID column 116*m*, and a change state column 116*p*.

The pre-change facility ID column 116*a*, the post-change facility ID column 116*b*, the manufactured object ID column 116c, the variety ID column 116d, the number column 116e, the process ID column 116f, the process No column 116g, the scheduled start time point column 116h, the scheduled end time point column 116j, the next process scheduled start time point column 116k, the next process facility ID column 116m, and the change state column 116p are associated with one another.

The pre-change facility ID column 116a stores a facility ID, which is identification information for uniquely identifying a production facility or a production resource in a production area. The pre-change facility ID column 116a stores a facility ID for which the production instruction is received before the production instruction change generated by the production instruction change and management unit 125.

The post-change facility ID column 116b stores a facility ID, which is identification information for uniquely identifying a production facility or a production resource in a production area. The post-change facility ID column 116b stores a facility ID to receive the production instruction in the production instruction change generated by the production instruction change and management unit 125.

The manufactured object ID column 116c stores each manufactured object ID of a product a component, or the like subjected to the change instruction so as to be processed by the production facility identified in the post-change facility ID column 116b.

The variety ID column 116d stores information for identifying the variety of the manufactured object identified in the manufactured object ID column 116c.

The number column 116e stores information for identifying the quantity of the manufactured object identified in the manufactured object ID column 116c.

The process ID column 116f stores information for identifying an instructed process for processing the manufactured object identified in the manufactured object ID column 116c in the production facility identified in the post-change facility ID column 116b.

The process No column 116g stores information for identifying an order, counting from a first process, of the process in the process ID column 116f related to the manufactured object identified in the manufactured object ID column 116c.

The scheduled start time point column 116h stores, as a production instruction, information for identifying a scheduled time point at which the process identified in the process ID column 116f is to be started for the manufactured object identified in the manufactured object ID column 116c in the production facility identified in the post-change facility ID column 116b.

The scheduled end time point column 116j stores, as a production instruction, information for identifying a scheduled time point at which the process identified in the process ID column 116f is to be completed for the manufactured object identified in the manufactured object ID column 116c in the production facility identified in the post-change facility ID column 116b.

The next process scheduled start time point column 116k stores, as a production instruction, information for identifying a scheduled time point at which a process next to the process identified in the process ID column 116f is to be started for the manufactured object identified in the manufactured object ID column 116c.

The next process facility ID column 116m stores, as a production instruction, information for identifying a scheduled production facility that is to perform a process next to the process identified in the process ID column 116f for the manufactured object identified in the manufactured object ID column 116c.

The change state column 116p stores information for identifying whether a change instruction for changing the production facility identified in the pre-change facility ID column 116a used in the process identified in the process ID column 116f, in which the manufactured object identified in the manufactured object ID column 116c is processed as a target, to the production facility identified in the post-change facility ID column 116b is reflected in the production instruction of the distributed production planning and instruction apparatus 100 provided in the production facility identified in the post-change facility ID 116b. When the reflection is not completed, the change state column 116p is blank or stores a value "not yet". When the reflection is completed, the change state column 116p stores a value "completed".

Return to the description on FIG. 2. The distributed planning input information storage unit 117 stores information necessary for processing of the information management unit 121, the planning change necessity determination unit 122, the distributed planning range calculation unit 123, the distributed planning generation unit 124, and the production instruction change and management unit 125 for the production facility or the production resource in the production area. Here, the distributed planning input information storage unit 117 targets the following as the production facility or the production resource in the production area.

The target production facility or production resource in the production area that is provided with the distributed production planning and instruction apparatus 100.

The production facility or the production resource in the production area relating to the re-planning for recovering the delay for the production instruction.

A production facility or a production resource in a production area that is in charge of the next process of the production instruction to the distributed production planning and instruction apparatus 100.

FIG. 9 is a diagram illustrating a data configuration example of the distributed planning input information storage unit. The distributed planning input information storage unit 117 stores information acquired by the information management unit 121 from the production management apparatus 200 and the production planning apparatus 210 described later.

The distributed planning input information storage unit 117 includes a facility ID column 117a, a facility capability column 117b, a connection information column 117c, a transport time column 117d, a transport request destination information column 117e, and a type column 117f.

The facility ID column 117a, the facility capability column 117b, the connection information column 117c, the transport time column 117d, the transport request destination information column 117e, and the type column 117f are associated with one another.

The facility ID column 117a stores a facility ID, which is identification information for uniquely identifying a production facility or a production resource in a production area.

The facility capability column 117b stores numerical value information obtained by quantifying a production capacity of the production facility identified in the facility ID column 117a (for example, a volume per unit time).

The connection information column 117c stores information for connecting to the distributed production planning and instruction apparatus 100 provided in the production facility identified in the facility ID column 117*a* via the network 370 (for example, internet protocol (IP) address).

The transport time column 117*d* stores information for identifying a time required for transporting a manufactured object from the current production facility 340 provided with the distributed production planning and instruction apparatus 100 having the distributed planning input information storage unit 117 to the production facility identified in the facility ID column 117*a*. For example, when ten minutes is required as the transport time, a value "10" is stored in the transport time column 117*d*.

The transport request destination information column 117*e* stores information of a connection destination when the transport of the manufactured object from the current production facility 340 provided with the distributed production planning and instruction apparatus 100 having the distributed planning input information storage unit 117 to the production facility identified in the facility ID column 117*a* is requested via the network 370. When a transport request via the network 370 is not necessary or the transport cannot be performed, the transport request destination information column 117*e* is blank.

The type column 117*f* stores temporary attribute information of the production facility identified in the facility ID column 117*a*. Information of the type column 117*f* is generated by the information management unit 121 and is used by the planning change necessity determination unit 122, the distributed planning range calculation unit 123, and the distributed planning generation unit 124.

Return to the description on FIG. 2. The processing units 120 of the distributed production planning and instruction apparatus 100 include the information management unit 121, the planning change necessity determination unit 122, the distributed planning range calculation unit 123, the distributed planning generation unit 124, the production instruction change and management unit 125, and the alert information management unit 126.

At a predetermined frequency (for example, every 12 hours) or at a specified time, the information management unit 121 inquires the production management 200, the production planning apparatus 210, and the target production facility 340 that is provided with the distributed production planning and instruction apparatus 100 via the communication unit 130, acquires information stored in the production instruction storage unit 111, the group production instruction storage unit 112, the group production state storage unit 113, the group abnormality storage unit 114, and the distributed planning input information storage unit 117, generates necessary information, and updates information stored in each processing unit.

At a predetermined frequency (for example, every 30 minutes) or at a specified time, the information management unit 121 inquires the production management apparatus 200 and the target production facility 340 that is provided with the distributed production planning and instruction apparatus 100 via the communication unit 130, acquires and updates the information stored in the group production state storage unit 113 and the group abnormality storage unit 114, and executes a processing of the planning change necessity determination unit 122 in accordance with the updated content.

The information management unit 121 executes processing of the distributed planning range calculation unit 123, the distributed planning generation unit 124, and the production instruction change and management unit 125 in accordance with a determination result of necessity of the planning change, and generates information stored in the production instruction change storage unit 116. In addition, the information management unit 121 executes a processing of the alert information management unit 126 in accordance with an execution result of the production instruction change and management unit 125.

The planning change necessity determination unit 122 determines the necessity of the planning change. Specifically, the planning change necessity determination unit 122 determines that the planning change is necessary when a time point at which the next process can be started is not in time for a scheduled start time point of the next process for any uncompleted production instruction.

The distributed planning range calculation unit 123 identifies a production facility used for the re-planning of the distributed planning generated by the distributed planning generation unit 124 (target facility), a re-planning period, and an uncompleted production instruction to be re-planned, and deliver the same to the distributed planning generation unit 124. Specifically, the distributed planning range calculation unit 123 sets, as a distributed planning period, a period including the latest one of the uncompleted production instructions in which the time point at which the next process can be started is not in time for the scheduled start time point of the next process. In addition, the distributed planning range calculation unit 123 identifies the uncompleted production instructions in which the time point at which the next process can be started is not in time for the scheduled start time point of the next process as uncompleted production instructions subjected to distributed planning. Furthermore, the distributed planning range calculation unit 123 identifies a facility that can be substituted as a distributed planning target facility from the facility-process relation storage unit 115.

The distributed planning generation unit 124 re-plans the schedule for recovering the delay of the production instruction. Specifically, the distributed planning generation unit 124 generates, as a re-planning, a schedule in which the number of delays and a sum of delay time from the latest start date are minimized.

The production instruction change and management unit 125 registers, as the production instruction change, the re-planning generated by the distributed planning generation unit 124. Specifically, the production instruction change and management unit 125 determines whether the number of the uncompleted production instructions in which the time point at which the next process can be started is not in time for the scheduled start time point of the next process is decreased in the re-planning generated by the distributed planning generation unit 124, and registers the re-planning in the production instruction change storage unit 116 when the number is decreased. In addition, the production instruction change and management unit 125 transfers production instruction data for the production facility that is in charge of processing after the change of the production instruction to the production instruction change and management unit 125 of the distributed production planning and instruction apparatus, and transmits the transport request to a transport request destination related to the transport of the manufactured object to the production facility.

The alert information management unit 126 transmits production planning unachieved alert information for a production instruction in which the planning may be unachieved to the production planning apparatus 210 and the production management apparatus 200 related to the entire factory.

The communication unit 130 transmits and receives various types of information to and from other devices via the network.

The input unit 140 receives, for example, input information that is displayed and operated on a screen and operated and input by a keyboard or a mouse.

The output unit 150, for example, creates screen information including information to be output as a result of performing a predetermined processing, and outputs the screen information to the production instruction terminal 320 via the communication unit 130.

FIG. 10 is a diagram illustrating a hardware configuration example of the distributed production planning and instruction apparatus. The distributed production planning and instruction apparatus 100 can be realized by a general computer 900 that includes a processor 901 (for example, CPU or GPU), a memory 902 such as a random access memory (RAM), an external storage device 903 such as a hard disk device (HDD) or an SSD, a reading device 905 that reads information from a portable storage medium 904 such as a CD or a DVD, an input device 906 such as a keyboard, a mouse, a barcode reader, or a touch panel, an output device 907 such as a display, and a communication device 908 that communicates with another computer via a communication network such as a LAN or the Internet, or a network system that includes a plurality of computers 900. It is needless to say that the reading device 905 may be capable of not only reading from but also writing to the portable storage medium 904.

For example, the information management unit 121, the planning change necessity determination unit 122, the distributed planning range calculation unit 123, the distributed planning generation unit 124, the production instruction change and management unit 125, and the alert information management unit 126 included in the processing units 120 may be implemented by loading a predetermined program stored in the external storage device 903 into the memory 902 and executing the program by the processor 901. The input unit 140 may be implemented by the processor 901 using the input device 906. The output unit 150 may be implemented by the processor 901 using the output device 907 or the communication device 908. The communication unit 130 may be implemented by the processor 901 using the communication device 908. The storage unit 110 may be implemented by the processor 901 using the memory 902 or the external storage device 903.

The predetermined program may be downloaded into the external storage device 903 from the portable storage medium 904 via the reading device 905 or from the network via the communication device 908, and then loaded into the memory 902 and executed by the processor 901. Alternatively, the predetermined program may be directly loaded into the memory 902 from the portable storage medium 904 via the reading device 905 or from the network via the communication device 908, and then executed by the processor 901.

The performance input terminal 310 and the production instruction terminal 320 may also be implemented by the general computer 900 as illustrated in FIG. 10.

FIG. 11 is a diagram illustrating an example of a flow of a production instruction update processing. The production instruction update processing is started at a predetermined frequency (for example, every 12 hours), at a specified time, or when an instruction to start the processing is issued to the distributed production planning and instruction apparatus 100.

First, the information management unit 121 executes an initialization processing (step S101). Specifically, the initialization processing of the information management unit 121, which will be described later, is executed.

Then, the information management unit 121 acquires production instructions of the production facility 340 under control (current production facility) in a range of a predetermined period (for example, 24 hours) from the production planning apparatus 210, and stores the acquired production instructions in the production instruction storage unit 111 (step S102).

Then, the information management unit 121 performs processing of steps S104 to S106 for each operation instruction of the production facility 340 under control, which is acquired in step S102 (steps S103 and S107).

The information management unit 121 acquires facility information of the next process of the production instruction (step S104). Specifically, the information management unit 121 acquires information on the facility ID of the next process facility ID column 111k of the production instruction from the production management apparatus 200, sets "next process" in the type column 117f, and stores the information in the distributed planning input information storage unit 117.

Then, the information management unit 121 acquires facility IDs that can alternatively perform the processing (step S105). Specifically, the information management unit 121 extracts data in which both the variety ID column 115a and the process ID column 115b match the production instruction with reference to the facility-process relation storage unit 115, and acquires the facility IDs that can alternatively perform the processing other than the current facility ID among the extracted data.

Then, the information management unit 121 associates all facilities capable of alternatively performing the process by "group" (step S106). Specifically, the information management unit 121 sets "group" in the type column 117f for all the facility IDs acquired in step S105, and when any facility is not stored in the distributed planning input information storage unit 117, acquires information from the production management apparatus 200, replenishes the information, and stores the information in the distributed planning input information storage unit 117 (step S106).

The information management unit 121 acquires the production instruction from the production planning apparatus 210 for the facilities of "group" (step S108). Specifically, the information management unit 121 acquires a production instruction in a range of a predetermined period (for example, 24 hours) from the production planning apparatus 210 for all the facility IDs whose type column 117f is "group" in the distributed planning input information storage unit 117, and stores the acquired production instruction in the group production instruction storage unit 112.

Then, the information management unit 121 acquires production state information for the facility under control and the facilities of "group" (step S109). Specifically, the information management unit 121 acquires the production state information from the production management apparatus 200 and the production facility under control for a facility ID of the facility per se and all facility IDs in which "group" is stored in the type column 117f in the distributed planning input information storage unit 117, and stores the acquired production state information in the group production state storage unit 113.

Then, the information management unit 121 acquires abnormality information for the facility under control and the facilities of "group" (step S110). Specifically, the information management unit 121 acquires the abnormality information from the production management apparatus 200 and the production facility under control for the facility ID of the facility per se and all facility IDs in which "group" is stored in the type column 117f in the distributed planning input information storage unit 117, and stores the acquired abnormality information in the group abnormality storage unit 114.

The above is an example of the flow of the production instruction update processing. According to the production instruction update processing, the update of the production instruction can be reflected.

FIG. 12 is a diagram illustrating an example of a flow of the initialization processing of the information management unit. The initialization processing of the information management unit 121 is started in step S101 of the production instruction update processing.

First, the information management unit 121 deletes all data stored in the production instruction storage unit 111 (step S111).

Then, the information management unit 121 deletes all data stored in the group production instruction storage unit 112 (step S112).

Then, the information management unit 121 deletes all data stored in the group production state storage unit 113 (step S113).

Then, the information management unit 121 deletes all data stored in the group abnormality storage unit 114 (step S114).

Then, the information management unit 121 deletes all data stored in the production instruction change storage unit 116 (step S115).

Then, the information management unit 121 deletes all data other than data in which the type column 117f is "current" among information stored in the distributed planning input information storage unit 117 (step S116).

The above is an example of the flow of the initialization processing of the information management unit 121. According to the initialization processing of the information management unit 121, it is possible to initialize a data set for updating various production instructions.

FIG. 13 is a diagram illustrating an example of a flow of the periodic update processing. The periodic update processing is started at a predetermined frequency (for example, every 30 seconds), at a specified time, or when an instruction to start the processing is issued to the distributed production planning and instruction apparatus 100.

First, the information management unit 121 collects information on the operation state (step S121).

Specifically, the information management unit 121 acquires production state and abnormality information from the production management apparatus 200 or the production facility 340 under control, and updates data of the group production state storage unit 113 and the group abnormality storage unit 114.

Then, the information management unit 121 determines whether completion information on a process of the production facility 340 under control or the production facilities of the group is updated (step S122). Specifically, in step S121, the information management unit 121 determines whether information on the facility ID of the production facility 340 under control or the production facilities of the group is updated. When the information on the facility ID is not updated (in a case of "NO" in step S122), the information management unit 121 ends the periodic update processing.

When the information is updated (in a case of "YES" in step S122), the information management unit 121 updates the completion column of the processes of the production facility under control and the production facilities of the group (step S123). Specifically, the information management unit 121 acquires information from the production management apparatus 200 or the production facility 340 under control, and updates the completion column 111m of the production instruction storage unit 111 and the completion column 112m of the group production instruction storage unit 112 of the completed processes related to the corresponding production facilities to a completion state.

Then, the information management unit 121 executes a planning change necessity determination processing described later (step S124).

Then, the information management unit 121 determines whether a planning change is necessary in a result of step S124 (step S125). When the planning change is not necessary (in a case of "NO" in step S125), the information management unit 121 ends the periodic update processing.

When the planning change is necessary (in a case of "YES" in step S125), the information management unit 121 executes a distributed planning range calculation processing described later (step S126).

Then, the information management unit 121 executes a distributed planning generation processing described later (step S127).

Then, the information management unit 121 executes an instruction change output processing described later (step S128).

Then, the information management unit 121 determines whether delay recovery is possible from a processing result of the instruction change management processing (step S129). Specifically, the information management unit 121 determines recovery is possible when the re-planning is made such that all the production instructions can be completed in a distributed planning range (period, facility, and production amount). When recovery is possible (in a case of "YES" in step S129), the information management unit 121 ends the periodic update processing.

When recovery is impossible (in a case of "NO" in step S129), the information management unit 121 executes an alert processing (step S130).

The above is an example of the flow of the periodic update processing. According to the periodic update processing, when a delay or an abnormality occurs in a production status, it is possible to perform re-planning using a localized production facility capable of alternatively performing the process and to promptly start production reflecting a change in the production planning.

FIG. 14 is a diagram illustrating an example of a flow of the planning change necessity determination processing. The planning change necessity determination processing is started in step S124 of the periodic update processing.

First, the planning change necessity determination unit 122 identifies an uncompleted production instruction (step S201). Specifically, the planning change necessity determination unit 122 refers to the production instruction storage unit 111 and identifies data in which the completion column 111m is blank as the uncompleted production instruction.

Then, the planning change necessity determination unit 122 reflects a start time point and a scheduled end time point for an uncompleted production instruction that is "started" (step S202). Specifically, the planning change necessity determination unit 122 acquires data in which the facility ID matches the production facility used in the uncompleted production instruction identified in step S201 from the group production state storage unit 113, and when the state column 113b is "started", reflects the data to the scheduled start time point column 111*g* and the scheduled end time point column 111*h* of the corresponding data of the uncompleted production instruction.

Then, the planning change necessity determination unit 122 calculates a facility stop period due to the abnormality for the production facility in which an abnormality has occurred and is not taken countermeasure against (step S203). Specifically, when the facility ID column 114*a* is the same facility ID as the production facility under control and the countermeasure state column 114*e* is "blank" in any piece of data in the group abnormality storage unit 114, the planning change necessity determination unit 122 acquires the piece of data and calculates a period between the time point of the occurrence time point column 114*c* and the time point of the scheduled recovery time point column 114*d* as the facility stop period.

Then, the planning change necessity determination unit 122 performs simulation while maintaining the uncompleted production instruction (step S204). Specifically, the planning change necessity determination unit 122 postpones an execution time point such that the operation is started after the facility stop period is ended without starting a new operation in the facility stop period, thereby allocating the execution periods of all the uncompleted production instructions in the period from the current time point to the previous time. Then, the planning change necessity determination unit 122 uses data of the facility capability column 117*b* of the current facility ID acquired from the distributed planning input information storage unit 117 and calculates the scheduled start time point and the scheduled end time point for the allocated uncompleted production instruction.

Then, the planning change necessity determination unit 122 calculates a possible start time point of the next process for each simulated uncompleted production instruction (step S205). Specifically, the planning change necessity determination unit 122 identifies a production facility of the next process using the next process facility ID column 111*k* of the production instruction storage unit 111, and identifies a transport time to the production facility of the next process using the information of the transport time column 117*d* of the distributed planning input information storage unit 117. Alternatively, when an abnormality occurs in the production facility, the transport time may be set to be longer than usual (for example, twice). Then, the planning change necessity determination unit 122 calculates a possible start time point of the next process by adding the transport time to the scheduled end time point of the present process.

Then, the planning change necessity determination unit 122 calculates, for each simulated uncompleted production instruction, a determination term J for determining whether the possible start time point of the next process is in time for the scheduled start time point (step S206). Specifically, the planning change necessity determination unit 122 calculates, for each uncompleted production instruction, determination term J=(next process scheduled start time point)−(possible start time point of next process).

Then, the planning change necessity determination unit 122 determines whether one or more pieces of data satisfy J<0 among the uncompleted production instructions (step S207).

When at least one piece of data satisfies J<0 (in a case of "YES" in step S207), the planning change necessity determination unit 122 determines that the planning change is necessary and delivers information of the uncompleted production instruction to the distributed planning range calculation unit 123 (step S208).

When no data satisfies J<0 (in a case of "NO" in step S207), the planning change necessity determination unit 122 determines that the planning change is unnecessary, and any data is updated in step S121 of the periodic update processing in the group abnormality storage unit 114, stores "unnecessary" in the countermeasure state column 114*e* of the data (step S209). That is, the planning change necessity determination unit 122 can be regarded as determining that planning change is unnecessary in a case where the production instruction can be complied in consideration of the stop period of the production element that is caused by the abnormality.

The above is an example of the flow of the planning change necessity determination processing. According to the planning change necessity determination processing, it is possible to determine whether a delay is to occur when the production is continued without changing the planning in any process. Moreover, when an abnormality occurs, it is also possible to determine that the planning change is unnecessary when the production instruction can be complied in consideration of the stop period of the production element that is caused by the abnormality.

FIG. 15 is a diagram showing an example of a flow of the distributed planning range calculation processing. The distributed planning range calculation processing is started in step S126 of the periodic update processing.

First, the distributed planning range calculation unit 123 receives input of all uncompleted production instructions to become the result of the planning change necessity determination processing (step S301).

Then, the distributed planning range calculation unit 123 sets the distributed planning period (step S302). Specifically, the distributed planning range calculation unit 123 acquires the latest next process scheduled start time point from the production instructions satisfying J<0, and sets a period from the current time point to the next process scheduled start time point as the distributed planning period.

Then, the distributed planning range calculation unit 123 sets a distributed planning target production instruction (step S303). Specifically, the distributed planning range calculation unit 123 extracts, from the production instructions satisfying J<0, a production instruction having the latest scheduled start time point and uncompleted production instructions of the distributed planning target having an earlier scheduled start time point as the distributed planning target production instructions.

Then, the distributed planning range calculation unit 123 sets the distributed planning target facility (step S304). Specifically, for each distributed planning target production instruction, the distributed planning range calculation unit 123 extracts data in which both the variety ID column 115*a* and the process ID column 115*b* match the current production instruction from the facility-process relation storage unit 115, acquires a facility ID other than the facility ID in the current production instruction from the facility column 115*c*, and sets an alternative facility as the distributed planning target facility.

Then, the distributed planning range calculation unit 123 delivers the distributed planning period, the distributed planning target production instruction, and the distributed planning target facility to the distributed planning generation unit 124 (step S305).

The above is an example of the flow of the distributed planning range calculation processing. According to the distributed planning range calculation processing, it is possible to identify a localized range as the distributed planning target, in particular, the period, the production instruction, and the production facility.

FIG. 16 is a diagram showing an example of a flow of the distributed planning generation processing. The distributed planning generation processing is started in step S127 of the periodic update processing.

First, the distributed planning generation unit 124 receives, as input, the distributed planning period, the distributed planning target production instruction, and the distributed planning target facility to become a result of the distributed planning range calculation processing (step S401).

Then, the distributed planning generation unit 124 adds the uncompleted production instruction related to the distributed planning target facility to the distributed planning target production instruction (step S402). Specifically, the distributed planning generation unit 124 acquires data in which the completion column 112m is blank from the group production instruction storage unit 112 for all facility IDs included in the distributed planning target facility, and sets the data as a new distributed planning target production instruction together with the existing distributed plan target production instruction.

Then, the distributed planning generation unit 124 identifies an operation start status of a facility related to the distributed planning target production instruction (step S403). Specifically, the distributed planning generation unit 124 acquires all data of the facility ID column 113a related to the distributed planning target production instruction from the group production state storage unit 113, and reflects the data to the corresponding data of the distributed planning target production instruction when the state column 113b is "started".

Then, the distributed planning generation unit 124 identifies a transport time to the next process for all the distributed planning target production instructions (step S404). Specifically, the distributed planning generation unit 124 identifies a next process facility with reference to the next process facility ID column 111k and the next process facility ID column 112k for all the distributed planning target production instructions, and reads the transport time column 117d of the distributed planning input information storage unit 117 to identify the transport time to the next process.

Then, the distributed planning generation unit 124 identifies the latest start time point for all the distributed planning target production instructions (step S405). Specifically, the distributed planning generation unit 124 calculates a difference between the scheduled start time point and a scheduled completion time point as a scheduled processing period for all the distributed planning target production instructions, and identifies a time point obtained by tracing back the transport time and the scheduled processing period from the next process scheduled start time point as the latest start time point.

Then, the distributed planning generation unit 124 identifies the earliest start time point for all the distributed planning target production instructions (step S406). Specifically, the distributed planning generation unit 124 identifies the scheduled start time point as the earliest start time point for all the distributed planning target production instructions.

Then, the distributed planning generation unit 124 generates a distributed production planning (step S407). Specifically, for all the operation instructions of the current facility in the distributed plan target production instruction within the planning period, the distributed planning generation unit 124 generates, as the distributed production planning, the schedule in which the number of delays and the sum of the delay time from the latest start date are minimized under a condition that the alternative facility is also available, and delivers the schedule to the production instruction change and management unit 125.

The above is an example of the flow of the distributed planning generation processing. According to the distributed planning generation processing, it is possible to create a distributed production planning optimized in a localized range.

FIG. 17 is a diagram illustrating an example of a flow of the instruction change output processing. The instruction change output processing is started in step S128 of the periodic update processing.

First, the production instruction change and management unit 125 receives the distributed production planning from the distributed planning generation unit 124 (step S501).

Then, the production instruction change and management unit 125 extracts production instructions of the production facility 340 under control alone from the distributed production planning, recalculates J, and identifies the number of production instructions satisfying J<0 and change thereof (step S502).

Then, the production instruction change and management unit 125 determines whether the number of the production instructions satisfying J<0 is decreased from a result of step S502 (step S503). When the number of the production instructions satisfying J<0 is not decreased (in a case of "NO" in step S503), the production instruction change and management unit 125 advances the control to step S505.

When the number of the production instructions satisfying J<0 is decreased (in a case of "YES" in step S503), the production instruction change and management unit 125 registers all production instructions that no longer satisfy J<0 in a waiting state for change management (step S504). Specifically, the production instruction change and management unit 125 sets the change state column 116p as "not yet" for all the production instructions not satisfying J<0 by the processing of the distributed planning generation unit 124, and stores the production instructions in the production instruction change storage unit 116 together with a pre-change facility ID.

Then, the production instruction change and management unit 125 sets "delay recovery possible" when the number of the production instructions satisfying J<0 is zero and sets "delay recovery impossible" when the remaining number satisfying J<0 is one or more (step S505). Specifically, the production instruction change and management unit 125 sets "delay recovery possible" and stores "completed" in the countermeasure state column 114e of the corresponding data of the group abnormality storage unit 114 when the number of the production instructions satisfying J<0, and sets "delay recovery impossible" when the number of the production instructions satisfying J<0 is one or more.

The above is an example of the flow of the instruction change output processing. According to the instruction change output processing, it is possible to determine that delay recovery is possible and to transmit a change instruction when no delay occurs in the created distributed production planning, and not to transmit the change instruction if otherwise.

FIG. 18 is a diagram illustrating an example of a flow of the instruction generation processing. The instruction generation processing is started following the instruction change output processing.

First, the production instruction change and management unit 125 extracts data in which the change state column 116*p* is "not yet" from change data stored in the production instruction change storage unit 116 (step S511).

Then, the production instruction change and management unit 125 applies the change data to the production instruction of the production facility under control (step S512). Specifically, the production instruction change and management unit 125 extracts change data in which the post-change facility ID 116*b* matches the ID of the facility under control from all extracted data, and overwrites the corresponding data of the production instruction storage unit 111. Then, the production instruction change and management unit 125 changes the value of the change state column 116*p* to "completed".

Then, the production instruction change and management unit 125 deletes production instructions that are no longer production instructions for the production facility 340 under control, and registers the same as group production instructions (step S513). Specifically, the production instruction change and management unit 125 extracts production instructions in which the post-change facility ID 116*b* matches the current facility ID from all extracted data, deletes data of the corresponding production instructions from the production instruction storage unit 111, and adds the data of the production instructions after change in the group production instruction storage unit 112.

Then, the production instruction change and management unit 125 transfers the production instructions that are no longer production instructions for the production facility 340 under control to the production instruction change and management unit 125 of the distributed production planning and instruction apparatus 100 to become a post-change facility (step S514). Specifically, the production instruction change and management unit 125 acquires information of the connection information column 117*c* of the distributed planning input information storage unit 117 to identify the distributed production planning and instruction apparatus 100 of the post-change facility, and transfers the data of the production instruction to the production instruction change and management unit 125 of the distributed production planning and instruction apparatus 100 of the post-change facility.

Then, the production instruction change and management unit 125 transmits the transport request to the distributed production planning and instruction apparatus 100 of the transport request destination (step S515). Specifically, the production instruction change and management unit 125 acquires information of the transport request destination information column 117*e* of the distributed planning input information storage unit 117 to identify the distributed production planning and instruction apparatus 100 of the transport request destination, and transmits the transport request. In addition, the production instruction change and management unit 125 changes the value of the change state column 116*p* to "completed".

The above is an example of the flow of the instruction generation processing. According to the instruction generation processing, it is possible to update an actual production instruction in accordance with the created distributed production planning, and to appropriately update the actual production instruction even when the production and the transport are transferred to other production facilities in the group.

FIG. 19 is a diagram illustrating an example of a flow of the change instruction reception processing. The change instruction reception processing is started in the distributed production planning and instruction apparatus 100 of a change destination when the change of the production instruction is output by the instruction change output processing.

First, the production instruction change and management unit 125 receives change instruction data from a distributed production planning and instruction apparatus that outputs the change of the production instruction (step S521).

Then, the production instruction change and management unit 125 sets the change state column 116*p* to "not yet" to store the received change instruction data in the production instruction change storage unit 116 (step S522).

The above is an example of the flow of the change instruction reception processing. According to the change instruction reception processing, it is possible to appropriately reflect the change even when the production and the transport are transferred to other production facilities in the group in accordance with the created distributed production planning.

FIG. 20 is a diagram illustrating an example of a flow of the alert processing. The alert processing is started in step S130 of the periodic update processing.

First, the alert information management unit 126 generates production planning unachieved alert information (step S601).

Then, the alert information management unit 126 transmits the production planning unachieved alert information to the production management apparatus 200 and the production planning apparatus 210 (step S602).

The above is an example of the flow of the alert processing. According to the alert processing, it is possible to transmit information indicating that the production planning is unachieved as alert information to the production management apparatus 200 and the production planning apparatus 210.

FIG. 21 is a diagram illustrating an example of a display screen of the distributed production planning and instruction apparatus. A production instruction screen 400 is an example of a screen for displaying an operation instruction to be confirmed by the operator or a site leader on the output unit 150 of the distributed production planning and instruction apparatus 100. In the production instruction screen 400, a display area 410 displays the facility ID for identifying the production facility 340 provided with the distributed production planning and instruction apparatus 100 and information on the state of the production facility. In addition, a display area 420 of the production instruction screen 400 displays the current time point is displayed. A production instruction display area 430 displays a production instruction (initial) instructed from the production planning apparatus 210 and a progress (display of "current" and vertical line) with respect to the production instruction. A production instruction display area 440 displays a production instruction updated in accordance with the production planning re-planned by the distributed production planning and instruction apparatus 100 (re-planning) together with the progress with respect to the production instruction.

A facility ID input column 450 receives input of a facility ID. A display instruction input column 460 receives input of a display instruction. A related production instruction display area 470 displays an operation instruction of a related production facility (group facility) identified by the facility ID received in the facility ID input column 450 together with a progress. A re-planning instruction input column 480 receives input of a re-planning instruction. When the re-planning execution instruction is input, the distributed production planning and instruction apparatus 100 starts the periodic update processing, and updates information displayed in the production instruction display area 440 when the production planning is re-planned.

The above is a configuration example of the distributed production planning and instruction system according to a first embodiment of the invention. According to the distributed production planning and instruction system 10 of the first embodiment, it is possible to determine whether local re-planning is necessary in a production facility 340 which may not satisfy the production planning, re-plan the production planning by narrowing down the re-planning period and the target range such as the target production facility and the target process to a necessary minimum according to the determination, and issue a production instruction based on the re-planning. Accordingly, it is possible to create an appropriate delay recovery planning at an appropriate timing with respect to occurring production delay, and to execute the delay recovery plan locally and autonomously without unnecessarily changing the overall planning.

In the above technique, the manufacturing site (area) 300 is assumed to be single, but is not limited thereto. In manufacturing sites (areas) 300 distributed in a plurality of regions, the same function can be realized by using a wide area network such as the Internet (including a 5G wireless communication network) as the network 370.

The embodiment described above has been described in detail for clearly explaining the invention, but is not necessarily to be considered limited to the inclusion of all of the configurations described. A part of a configuration of an embodiment can be replaced with another configuration. It is also possible to delete a part of a configuration of an embodiment.

The above-mentioned respective parts, configurations, functions, processing units, and the like may be partially or entirely achieved with hardware, for example, by designing with integrated circuits. The above-mentioned respective parts, configurations, functions, and the like may be achieved with software in a way that a processor interprets and executes programs for achieving the respective functions. Information such as programs, tables, and files for achieving the respective functions can be stored on a recording device such as a memory and a hard disk, or a storage medium such as an IC card, an SD card, and a DVD.

It is to be noted that control lines and information lines according to the above-mentioned embodiment are shown which are considered required for the sake of explanation, but the control lines and information lines required for a product may be not all shown. In fact, it is conceivable that almost all of the configurations are interconnected. The invention has been described above mainly with respect to the embodiment.

REFERENCE SIGN LIST

10 distributed production planning and instruction system
100 distributed production planning and instruction apparatus
110 storage unit
111 production instruction storage unit
112 group production instruction storage unit
113 group production state storage unit
114 group abnormality storage unit
115 facility-process relation storage unit
116 production instruction change storage unit
117 distributed planning input information storage unit
120 processing unit
121 information management unit
122 planning change necessity determination unit
123 distributed planning range calculation unit
124 distributed planning generation unit
125 production instruction change and management unit
126 alert information management unit
130 communication unit
140 input unit
150 output unit
200 production management apparatus
210 production planning apparatus
300 manufacturing site (area)
310 performance input terminal
320 production instruction terminal
340, 350, 360 production facility
370 network

The invention claimed is:

1. A distributed production planning and instruction apparatus, comprising:
   a storage unit configured to store;
   a plurality of production instructions each serving as an operation instruction for a production element including a production facility of a factory, a production resource, and an operator,
   a plurality of abnormality state information including an occurrence state of an abnormality of the production element,
   a plurality of production state information including state information indicating a state of each production facility and a start time and an end time,
   facility-process relation information for identifying, for each process to be performed by the production element, another production element capable of alternatively performing the process;
   a planning change necessity determination unit configured to, upon determining an abnormality in execution of the production instruction occurs in the production element, determine that planning change is unnecessary upon determining the production instruction can be complied in consideration of a stop period of the production element that is caused by the abnormality;
   a distributed planning range calculation unit configured to include the another alternative production element in a re-planning target range; and
   a distributed planning generation unit configured to re-plan the production instruction within the generated re-planning target range;
   wherein when the abnormality in the execution of the production instruction occurs in the production element, the planning change necessity determination unit postpones an execution time point such that an operation is started after the stop period of the production element that is caused by the abnormality is ended, thereby allocating execution periods of all uncompleted and started production instructions in a period after a current time point, and determines that the planning change is unnecessary in a case where a scheduled start time point of a next process can be complied, and
   wherein the uncompleted and started production instructions are identified by:
   determining, for each of the plurality of production instructions, whether completion information, indicating that the production instruction is complete, is blank, and determining, for each of the plurality of production state information of facilities determined to be uncomplete, whether the state information indicates production has started, and reflecting the start time and the end time in the production instruction for the corresponding production facility.

2. The distributed production planning and instruction apparatus according to claim 1, further comprising:
a production instruction change and management unit configured to output the production instruction re-planned by the distributed planning generation unit to the production element and the production element capable of alternatively performing the process.

3. The distributed production planning and instruction apparatus according to claim 1, further comprising:
an alert information management unit configured to transmit a predetermined alert to another apparatus that manages production of the entire factory when the distributed planning generation unit is incapable of re-planning within the re-planning target range.

4. The distributed production planning and instruction apparatus according to claim 2,
wherein when the production instruction to be re-planned includes an instruction not in time for a scheduled start time point of a next process, the production instruction change and management unit determines that the production instruction to be re-planned cannot be re-planned within the re-planning target range, and
wherein the distributed production planning and instruction apparatus comprises an alert information management unit configured to transmit a predetermined alert to another apparatus that manages production of the entire factory when the distributed planning generation unit is incapable of re-planning within the re-planning target range.

5. The distributed production planning and instruction apparatus according to claim 1,
wherein when the production element that alternatively performs the production instruction is present, the distributed planning generation unit re-plans the production instruction while including a transport time from the production element to the production element for performing a next process.

6. A distributed production planning and instruction system comprising:
a plurality of distributed production planning and instruction apparatuses each provided for one or more production facilities in a factory,
wherein the distributed production planning and instruction apparatuses each include:
a communication unit configured to communicate with another communication unit via a network;
a storage unit configured to store;
a plurality of production instructions each serving as an operation instruction for a production element including a production facility of a factory, a production resource, and an operator,
a plurality of abnormality state information including an occurrence state of an abnormality of the production element,
a plurality of production state information including state information indicating a state of each production facility and a start time and an end time,
facility-process relation information for identifying, for each process to be performed by the production element, another production element capable of alternatively performing the process;
a planning change necessity determination unit configured to, upon determining an abnormality in execution of the production instruction occurs in the production element, determine that planning change is unnecessary upon determining the production instruction can be complied in consideration of a stop period of the production element that is caused by the abnormality;
a distributed planning range calculation unit configured to include the another alternative production element in a re-planning target range;
a distributed planning generation unit configured to re-plan the production instruction within the generated re-planning target range; and
a production instruction change and management unit configured to transmit the production instruction re-planned by the distributed planning generation unit to the production element and the production element capable of alternatively performing the process, and start production management in accordance with the production instruction after receiving the production instruction,
wherein when the abnormality in the execution of the production instruction occurs in the production element, the planning change necessity determination unit postpones an execution time point such that an operation is started after the stop period of the production element that is caused by the abnormality is ended, thereby allocating execution periods of all uncompleted and started production instructions in a period after a current time point, and determines that the planning change is unnecessary in a case where a scheduled start time point of a next process can be complied, and
wherein the uncompleted and started production instructions are identified by:
determining, for each of the plurality of production instructions, whether completion information, indicating that the production instruction is complete, is blank, and determining, for each of the plurality of production state information of facilities determined to be uncomplete, whether the state information indicates production has started, and reflecting the start time and the end time in the production instruction for the corresponding production facility.

* * * * *